US012315453B2

(12) United States Patent
Park et al.

(10) Patent No.: US 12,315,453 B2
(45) **Date of Patent: *May 27, 2025**

(54) DISPLAY DEVICE

(71) Applicant: Samsung Display Co., LTD., Yongin-si (KR)

(72) Inventors: Se Hyuk Park, Yongin-si (KR); Jin Young Roh, Yongin-si (KR); Woo Mi Bae, Yongin-si (KR); Hae Kwan Seo, Yongin-si (KR); Young Ha Sohn, Yongin-si (KR); Jin Wook Yang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,068

(22) Filed: Oct. 20, 2023

(65) Prior Publication Data

US 2024/0054957 A1 Feb. 15, 2024

Related U.S. Application Data

(63) Continuation of application No. 17/840,543, filed on Jun. 14, 2022, now Pat. No. 11,798,478.

(30) Foreign Application Priority Data

Jun. 24, 2021 (KR) ........................ 10-2021-0082664

(51) Int. Cl.
*G09G 3/3241* (2016.01)
*G09G 3/20* (2006.01)

(52) U.S. Cl.
CPC ......... *G09G 3/3241* (2013.01); *G09G 3/2074* (2013.01); *G09G 2300/0413* (2013.01); *G09G 2300/0426* (2013.01)

(58) Field of Classification Search
CPC ...... G09G 3/3241; G09G 3/3233; G09G 3/32; G09G 3/3275; G09G 3/2003;
(Continued)

(56) References Cited

U.S. PATENT DOCUMENTS 6,614,498 B1 9/2003 Tanaka et al.
10,210,804 B2 2/2019 Kim et al.
(Continued)

FOREIGN PATENT DOCUMENTS

JP 3636192 4/2005
KR 10-2017-0031323 3/2017
(Continued)

OTHER PUBLICATIONS

Non-Final Office Action dated Jan. 18, 2023, in U.S. Appl. No. 17/840,543.

(Continued)

*Primary Examiner* — Prabodh M Dharia
(74) *Attorney, Agent, or Firm* — CANTOR COLBURN LLP

(57) ABSTRACT

A display device includes: a data driver for supplying a data signal to each of a plurality of data lines; and a pixel unit including a plurality of sub-pixels. The pixel unit further includes one dummy data line disposed separate from a data line of a first column among the data lines. The data line of the first column is connected to sub-pixels disposed on odd-numbered pixel rows among sub-pixels disposed on a first pixel column, and is connected to sub-pixels disposed on even-numbered pixel rows among sub-pixels disposed on a third pixel column. The dummy data line is connected to sub-pixels disposed on the even-numbered pixel rows among the sub-pixels disposed on the first pixel column.

22 Claims, 14 Drawing Sheets

PXC1: PX11, PX21, PX31, PX41
PXC2: PX12, PX22, PX32, PX42
PXC3: PX13, PX23, PX33, PX43
PXC4: PX14, PX24, PX34, PX44
PXC5: PX15, PX25, PX35, PX45
PXC6: PX16, PX26, PX36, PX46
PXC7: PX17, PX27, PX37, PX47
PXC8: PX18, PX28, PX38, PX48

(58) Field of Classification Search
CPC ......... G09G 3/2074; G09G 2300/0413; G09G 2300/0426; G09G 2300/0452; H10K 59/131; H10K 59/353; H10K 59/88
USPC .................................................. 345/204, 694
See application file for complete search history.

(56) References Cited

U.S. PATENT DOCUMENTS

| | | | | |
|---|---|---|---|---|
| 10,354,582 | B2 | 7/2019 | Kim | |
| 2008/0165298 | A1* | 7/2008 | Song | G09G 3/3648 349/139 |
| 2012/0113069 | A1* | 5/2012 | Kwon | G09G 3/3611 345/204 |
| 2013/0093739 | A1* | 4/2013 | Kim | G09G 3/3648 345/206 |
| 2013/0162616 | A1* | 6/2013 | Park | G09G 3/3648 345/87 |
| 2014/0232735 | A1 | 8/2014 | Jeong et al. | |
| 2015/0052666 | A1 | 2/2015 | Kanazawa | |
| 2015/0213772 | A1* | 7/2015 | Tung | G09G 3/3659 345/694 |
| 2016/0189669 | A1 | 6/2016 | Yang et al. | |
| 2016/0260394 | A1* | 9/2016 | Oh | G09G 3/3685 |
| 2016/0322008 | A1* | 11/2016 | Sang | G09G 3/3688 |
| 2018/0315801 | A1* | 11/2018 | Matsueda | H10K 59/1315 |
| 2018/0341156 | A1* | 11/2018 | Li | G02F 1/134336 |
| 2019/0272057 | A1 | 9/2019 | Chen et al. | |
| 2019/0279563 | A1 | 9/2019 | Hwang et al. | |
| 2019/0347986 | A1 | 11/2019 | Weng et al. | |
| 2020/0285088 | A1* | 9/2020 | Xu | G02F 1/136209 |
| 2021/0233455 | A1 | 7/2021 | Yang et al. | |
| 2021/0350736 | A1 | 11/2021 | Wu et al. | |
| 2022/0319408 | A1 | 10/2022 | Wang et al. | |

FOREIGN PATENT DOCUMENTS

| | | |
|---|---|---|
| KR | 10-2018-0072303 | 6/2018 |
| KR | 10-2020-0015870 | 2/2020 |
| KR | 10-2198645 | 1/2021 |

OTHER PUBLICATIONS

Notice of Allowance dated Jun. 14, 2023, in U.S. Appl. No. 17/840,543.

* cited by examiner

PXC1: PX11, PX21, PX31, PX41
PXC2: PX12, PX22, PX32, PX42
PXC3: PX13, PX23, PX33, PX43
PXC4: PX14, PX24, PX34, PX44
PXC5: PX15, PX25, PX35, PX45
PXCm-3: PX1m-3, PX2m-3, PX3m-3, PX4m-3
PXCm-2: PX1m-2, PX2m-2, PX3m-2, PX4m-2
PXCm-1: PX1m-1, PX2m-1, PX3m-1, PX4m-1
PXCm: PX1m, PX2m, PX3m, PX4m

DISPLAY DEVICE

CROSS-REFERENCE TO RELATED APPLICATION

This application is a Continuation of U.S. patent application Ser. No. 17/840,543, filed on Jun. 14, 2022, which claims priority from and the benefit of Korean Patent Application No. 10-2021-0082664, filed on Jun. 24, 2021, each of which is hereby incorporated by reference for all purposes as if fully set forth herein.

BACKGROUND

Field

Embodiments of the invention relate generally to a display device.

Discussion of the Background

With the development of information technologies, the importance of a display device increases because is a connection medium between a user and information. Accordingly, display devices, such as a liquid crystal display device and an organic light emitting display device, are increasingly used.

A display device may have various pixel structures by disposing sub-pixels emitting lights of red, green, and blue in various shapes and arrangements. It is known that a PENTILE™ pixel structure in which sub-pixels are arranged in a diamond shape has an excellent perceptual image quality.

The PENTILE™ pixel structure may have a structure in which sub-pixels emitting lights of red and blue are alternately connected to the same data line along an extending direction of data lines, and sub-pixels emitting lights of green are consecutively connected to the same data line along the extending direction of the data lines.

The data line to which the sub-pixels emitting lights of green are connected may supply only a green data signal for every one horizontal period, and the data line to which the sub-pixels emitting lights of red and blue are connected may alternately supply a red data signal and a blue data signal, which have different voltage levels, for every one horizontal period. As described above, a data line to which sub-pixels emitting lights of different colors are connected supplies voltages having different levels for every one horizontal period, and hence a peak current increases whenever the voltage level of a data signal varies. Therefore, power consumption may increase.

Accordingly, a PENTILE™ pixel structure in which only sub-pixels emitting lights of one color are connected to one data line has been researched.

The above information disclosed in this Background section is only for understanding of the background of the inventive concepts, and, therefore, it may contain information that does not constitute prior art.

SUMMARY

Devices constructed according to illustrative implementations of the invention are capable of enabling efficient operation when supplying a data signal to a data line that is connected to sub-pixels of differing colors.

Embodiments provide a display device capable of preventing a pixel defect that occurs in a boundary area of a pixel unit in which only a data signal of one color is supplied to one data line in a PENTILE™ pixel structure.

Additional features of the inventive concepts will be set forth in the description that follows, and in part will be apparent from the description, or may be learned by practice of the inventive concepts.

In accordance with an aspect of the present disclosure, there is provided a display device comprising: a data driver which supplies a data signal to each of a plurality of data lines; and a pixel unit including a plurality of sub-pixels.

The pixel unit further includes one dummy data line disposed separate from a data line of a first column among the plurality of data lines. The data line of the first column is connected to sub-pixels disposed on odd-numbered pixel rows among sub-pixels disposed on a first pixel column, and is connected to sub-pixels disposed on even-numbered pixel rows among sub-pixels disposed on a third pixel column. The dummy data line is connected to sub-pixels disposed on the even-numbered pixel rows among the sub-pixels disposed on the first pixel column.

A data line of a second column may be connected to all sub-pixels disposed on a second pixel column, and a data line of a fourth column may be connected to all sub-pixels disposed on a fourth pixel column.

A data line of a third column may be connected to sub-pixels disposed on the odd-numbered pixel row among the sub-pixels disposed on the third pixel column, and be connected to sub-pixels disposed on the even-numbered pixel rows among sub-pixels disposed on a fifth pixel column.

The data driver may include a plurality of source channels, and each of the source channels may provide data of one color to the data line.

Among the source channels, a first source channel connected to a first data line may provide a data signal of a first color, a second source channel connected to a second data line may provide a data signal of a second color, a third source channel connected to a third data line may provide a data signal of a third color, and a fourth source channel connected to a fourth data line may provide a data signal of the second color.

The data driver may further include a dummy source channel connected to the dummy data line. The dummy source channel may provide a data signal of the third color.

The first color may be red, the second color may be green, and the third color may be blue. The sub-pixels may include a light emitting element emitting light of a color corresponding to a data signal supplied from the data line connected thereto.

The first color may be blue, the second color may be green, and the third color may be red. The sub-pixels may include a light emitting element emitting light of a color corresponding to a data signal supplied from the data line connected thereto.

In the data signal of the third color, which is provided from the dummy source channel, data corresponding to the odd-numbered pixel rows may have a voltage level corresponding to grayscale 0.

In the data signal of the third color, which is provided from the dummy source channel, a voltage level of data corresponding to the odd-numbered pixel rows and a voltage level of data corresponding to the even-numbered pixel rows may be the same.

In the data signal of the third color, which is provided from the dummy source channel, a voltage level of data corresponding to the odd-numbered pixel rows may be a median value of voltage levels of data corresponding to adjacent odd-numbered pixel rows.

Each of the sub-pixels may comprise: a light emitting element; a first transistor including a gate electrode connected to a first node, a first electrode connected to a second node connected to a first driving power line, and a second electrode connected to a third node; a second transistor including a first electrode connected to the data line and a second electrode connected to the second node; a third transistor including a first electrode connected to a first electrode of the light emitting element and a second electrode connected to a power line through which an initialization voltage is supplied; a fourth transistor including a first electrode connected to a gate electrode of the first transistor and a second electrode connected to the power line; a fifth transistor including a first electrode connected to the first driving power line and a second electrode connected to the second node; a sixth transistor including a first electrode connected to the third node and a second electrode connected to the first electrode of the light emitting element; and a seventh transistor including a first electrode connected to the first node and a second electrode connected to the third node.

The display device may further include a storage capacitor disposed between the first driving power line and the first node.

A second transistor included in each of the sub-pixels disposed on the even-numbered pixel rows of the third pixel column may be connected to the data line of the first column through a first contact hole, and a second transistor included in each of the sub-pixels disposed on the even-numbered pixel rows of the fifth pixel column may be connected to the data line of the third column through a second contact hole.

A second transistor included in each of the sub-pixels disposed on the even-numbered pixel rows of the first pixel column may be connected to the dummy data line through a third contact hole.

In accordance with another aspect of the present disclosure, there is provided a display device including: a first sub-pixel disposed on a first pixel row and a first pixel column, the first sub-pixel displaying a first color; a second sub-pixel disposed on the first pixel row and a second pixel column, the second sub-pixel displaying a second color; a third sub-pixel disposed on the first pixel row and a third pixel column, the third sub-pixel displaying a third color; a fourth sub-pixel disposed on the first pixel row and a fourth pixel column, the fourth sub-pixel displaying the second color; a fifth sub-pixel disposed on a second pixel row and the first pixel column, the fifth sub-pixel displaying the third color; a sixth sub-pixel disposed on the second pixel row and the second pixel column, the sixth sub-pixel displaying the second color; a seventh sub-pixel disposed on the second pixel row and the third pixel column, the seventh sub-pixel displaying the first color; an eighth sub-pixel disposed on the second pixel row and the fourth pixel column, the eighth sub-pixel displaying the second color; and a ninth sub-pixel disposed on the second pixel row and a fifth pixel column, the ninth sub-pixel displaying the third color.

The first sub-pixel and the seventh sub-pixel are connected to a first data line through which a data signal of the first color is provided, the second sub-pixel and the sixth sub-pixel are connected to a second data line through which a data signal of the second color is provided, the third sub-pixel and the ninth sub-pixel are connected to a third data line through which a data signal of the third color is provided, the fourth sub-pixel and the eighth sub-pixel are connected to a fourth data line through which a data signal of the second color is provided, and the fifth sub-pixel is connected to a dummy data line through which data of the third color is provided.

The display device may include a data driver configured to supply the data signal of the first color is supplied to the first data line, supply the data signal of the second color to the second and fourth data line, and supply the data signal of the third color to the third data line.

The data driver may include a dummy source channel connected to the dummy data line. The dummy source channel may provide the data signal of the third color.

The first color may be red, the second color may be green, and the third color may be blue.

In the data signal of the third color, which is provided from the dummy source channel, a voltage level of data corresponding to odd-numbered pixel rows and a voltage level of data corresponding to even-numbered pixel rows may be the same.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
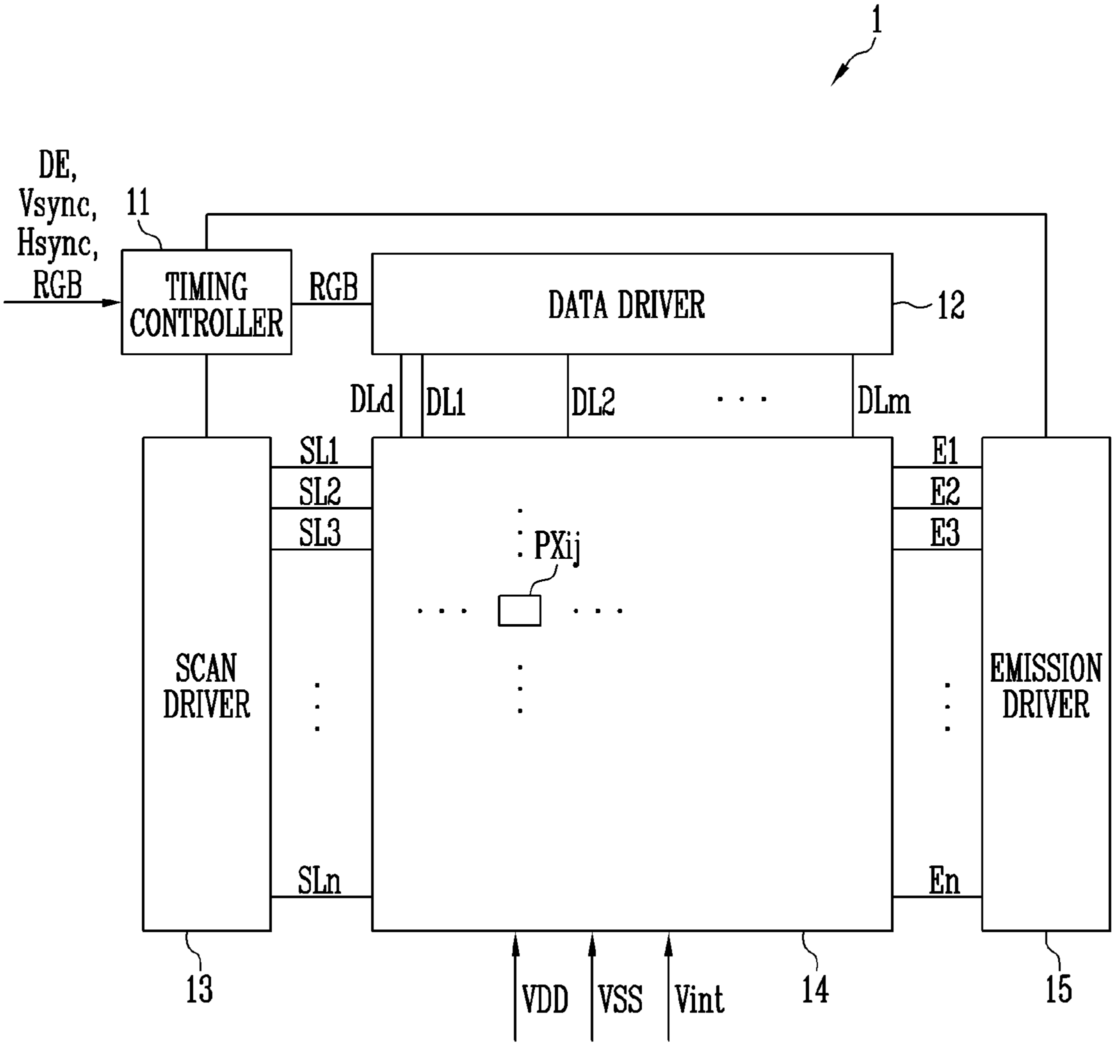
FIG. 1 is a diagram illustrating a display device in accordance with an embodiment that is constructed according to principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments will be described in more detail with reference to the accompanying drawings.

FIG. 1 is a diagram illustrating a display device in accordance with an embodiment that is constructed according to principles of the invention.

Referring to FIG. 1, the display device 1 in accordance with the embodiment may include a timing controller 11, a data driver 12, a scan driver 13, a pixel unit 14, and an emission driver 15.

The timing controller 11 may receive an external input signal from an external processor. The external input signal may include a vertical synchronization signal Vsync, a horizontal synchronization signal Hsync, a data enable signal DE, RGB data RGB, and the like.

The vertical synchronization signal Vsync may include a plurality of pulses, and indicate that a previous frame period is ended and a current frame period is started with respect to a time at which each of the pulses is generated. An interval between adjacent pulses of the vertical synchronization signal Vsync may correspond to one frame period. The horizontal synchronization signal Hsync may include a plurality of pulses, and indicate that a previous horizontal period is ended and a new horizontal period is started with respect to a time at which each of the pulses is generated. An interval between adjacent pulses of the horizontal synchronization signal Hsync may correspond to one horizontal period. The data enable signal DE may indicate that RGB data is supplied in a horizontal period. The RGB data may be supplied in units of pixel rows in horizontal periods, corresponding to the data enable signal DE. RGB data corresponding to one frame may be referred to as one input image.

The data driver 12 may receive a control signal and RGB data RGB from the timing controller 11. The data driver 12 may convert the RGB data RGB in a digital form into an analog data signal (or date voltage).

The data driver 12 may supply a data signal to data lines DL1 to DLm, corresponding to the control signal. The data signal supplied to the data lines DL1 to DLm may be supplied to be synchronized with a scan signal supplied to scan lines SL1 to SLn.

The scan driver 13 may receive a clock signal, a scan start signal, and the like from the timing controller 11, and generate scan signals to be provided to the scan lines SL1 to SLn. The scan signals may be set to a gate-on voltage (e.g., a low voltage) corresponding to the type of a transistor to which the corresponding scan signals are supplied. A transistor receiving a scan signal may be set to a turn-on state when the scan signal is supplied. For example, a gate-on voltage of a scan signal supplied to a P-channel metal oxide semiconductor (PMOS) transistor may have a logic low level, and a gate-on voltage of a scan signal supplied to an N-channel metal oxide semiconductor (NMOS) transistor may have a logic high level. Hereinafter, "that a scan signal is supplied" may be understood as that the scan signal is supplied at a logic level at which a transistor controlled by the scan signal is turned on.

The pixel unit 14 may include the scan lines SL1 to SLn, emission control lines E1 to En, and the data lines DL1 to DLm, and include sub-pixels PXij connected to the scan lines SL1 to SLn, the emission control lines E1 to En, and the data lines DL1 to DLm (m and n are integer greater than 1). In accordance with an embodiment, the pixel unit 14 may include a dummy data line DLd in an area adjacent to a first data line DL1 or an mth data line Dm. The dummy data line DLd may be connected to sub-pixels PXij that are not connected to the data lines DL1 to DLm, to provide a predetermined data signal. The dummy data line DLd will be described in detail later with reference to FIGS. 6 to 8C.

Each of the sub-pixels PXij may include a driving transistor and a plurality of switching transistors. The sub-pixels PXij may be supplied with a first driving power source VDD, a second driving power source VSS, and an initialization voltage Vint from a power supply. A voltage level of the second driving power source VSS may be lower than that of the first driving power source VDD. For example, a voltage of the first driving power source VDD may be a positive voltage, and a voltage of the second driving power source VSS may be a negative voltage.

The emission driver 15 may receive a clock signal, an emission stop signal, and the like from the timing controller 11, and generate emission control signals to be supplied to the emission control lines E1 to En. An emission control signal may be sequentially supplied to the emission control lines E1 to En.

The emission control signal may be set to a gate-off voltage (e.g., a high voltage). A transistor receiving an emission control signal may be turned off when the emission control signal is supplied, and be set to the turn-on state in other cases. Hereinafter, "that an emission control signal is supplied" may be understood as that the emission control signal is supplied at a logic level at which a transistor controlled by the emission control signal is turned off.

For convenience of description, a case where each of the scan driver 13 and the emission driver 15 is a single component has been illustrated in FIG. 1. However, the embodiment described herein is not limited thereto. At least portions of the scan driver 13 and the emission driver 15 may be integrated as one driving circuit, one module, or the like.

Figure 2:
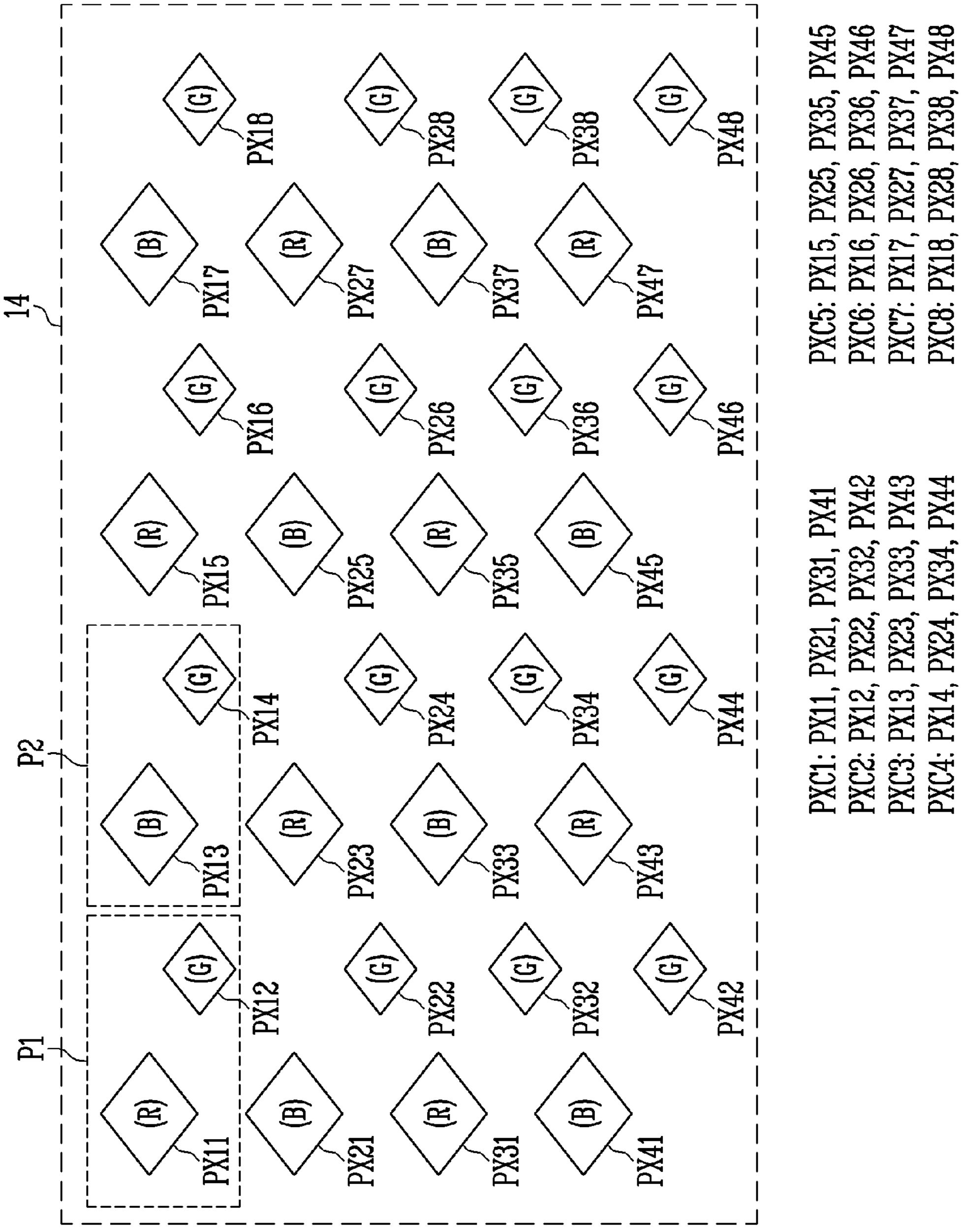
FIG. 2 is a diagram illustrating an example of a pixel unit provided in the display device shown in FIG. 1.

FIG. 2 is a diagram illustrating an example of the pixel unit provided in the display device shown in FIG. 1.

Referring to FIGS. 1 and 2, the pixel unit 14 having a PENTILE™ structure is illustrated. In accordance with an embodiment, the PENTILE™ structure may have a structure in which a first pixel P1 having sub-pixels PX11 and PX12 emitting lights of red R and green G and a second pixel P2 having sub-pixels PX13 and PX14 emitting lights of blue B and the green G are alternately arranged in a horizontal direction and a vertical direction. In other words, the PENTILE™ structure may have a structure in which sub-pixels PXij emitting lights of the red R and the blue B are alternately disposed along an extending direction of the data lines DL1 to DLm, and sub-pixels PXij emitting light of the green G are consecutively disposed along the extending direction of the data lines DL1 to DLm.

The pixel unit 14 may include a first pixel column PXC1, a second pixel column PXC2, a third pixel column PXC3, a fourth pixel column PXC4, a fifth pixel column PXC5, a sixth pixel column PXC6, a seventh pixel column PXC7, and an eighth pixel column PXC8. Although the first to eighth pixel columns PXC1, PXC2, PXC3, PXC4, PXC5, PXC6, PXC7, and PXC8 have been illustrated in FIG. 2, the embodiment described herein is not limited thereto, and the pixel unit 14 may include a larger number of pixel columns.

On the first pixel column PXC1, sub-pixels PXij emitting lights of the red R and the blue B may be alternately disposed along the extending direction of the data lines DL1 to DLm. The first pixel column PXC1 may include an eleventh sub-pixel PX11, a twenty-first sub-pixel PX21, a thirty-first sub-pixel PX31, and a forty-first sub-pixel PX41.

On the second pixel column PXC2, sub-pixels PXij emitting light of the green G may be consecutively disposed along the extending direction of the data lines DL1 to DLm. The second pixel column PXC2 may include a twelfth sub-pixel PX12, a twenty-second sub-pixel PX22, a thirty-second pixel PX32, and a forty-second sub-pixel PX42.

On the third pixel column PXC3, sub-pixels PXij emitting light of the blue B and the red R may be alternately disposed along the extending direction of the data lines DL1 to DLm. The third pixel column PXC3 may include a thirteenth sub-pixel PX13, a twenty-third sub-pixel PX23, a thirty-third sub-pixel PX33, and a forty-third sub-pixel PX43. That is, when the sub-pixel PX13 (B) is disposed on a first row of the third pixel column PXC3, the sub-pixel PX11 (R) may be disposed on a first row of the first pixel column PXC1.

On the fourth pixel column PXC4, sub-pixels PXij emitting light of green G may be consecutively disposed along the extending direction of the data lines DL1 to DLm. The fourth pixel column PXC4 may include a fourteenth sub-pixel PX14, a twenty-fourth sub-pixel PX24, a thirty-fourth sub-pixel PX34, and a forty-fourth sub-pixel PX44.

The fifth pixel column PXC5 may include a fifteenth sub-pixel PXC15, a twenty-fifth sub-pixel PXC25, a thirty-fifth sub-pixel PXC35, and a forty-fifth sub-pixel PXC45. The seventh pixel column PXC7 may include a seventeenth sub-pixel PX17, a twenty-seventh sub-pixel PX27, a thirty-seventh sub-pixel PX37, and a forty-seventh sub-pixel PX47. Like the first pixel column PXC1, the sub-pixels PX15 and PX35 (R) and the sub-pixels PX25 and PX45 (B) may be alternately disposed on the fifth pixel column PXC5. Like the third pixel column PXC3, the sub-pixels PX17 and PX37 (B) and the sub-pixels PX27 and PX47 (R) may be alternately disposed on the seventh pixel column PXC7.

The sixth pixel column PXC6 may include a sixteenth sub-pixel PX16, a twenty-sixth sub-pixel PX26, a thirty-sixth sub-pixel PX36, and a forty-sixth sub-pixel PX46. The eighth pixel column PXC8 may include an eighteenth sub-pixel PX18, a twenty-eighth sub-pixel PX28, a thirty-eighth sub-pixel PX38, and a forty-eighth sub-pixel PX48. That is, like the second pixel column PXC2 and the fourth pixel column PXC4, a plurality of sub-pixels PX16, PX26, PX36, PX46, PX18, PX28, PX38, and PX48 (G) emitting light of green G may be disposed on the sixth pixel column PXC6 and the eighth pixel column PXC8.

Figure 3:
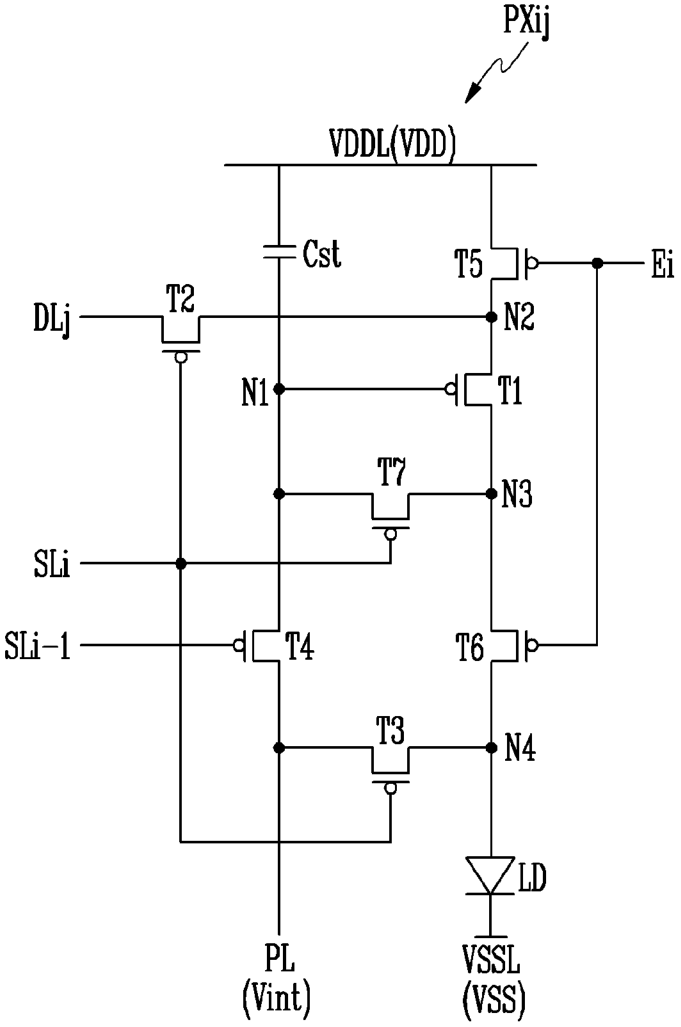
FIG. 3 is a diagram illustrating an example a sub-pixel provided in the display device shown in FIG. 1.

FIG. 3 is a diagram illustrating an example the sub-pixel provided in the display device shown in FIG. 1.

For convenience of description, a sub-pixel which is located on an ith horizontal line and is connected to a jth data line DLj will be illustrated in FIG. 3.

Referring to FIG. 3, the sub-pixel PXij provided in the display device 1 of the embodiments described with reference to that figure may include a light emitting element LD, transistors T1 to T7, and a storage capacitor Cst. The sub-pixel PXij of the embodiment described herein is not limited to the structure show in FIG. 3, and may have various structures. Hereinafter, it is assumed that the sub-pixel PXij has the structure shown in FIG. 3.

A first electrode (e.g., an anode electrode) of the light emitting element LD may be connected to a fourth node N4, and a second electrode (e.g., a cathode electrode) of the light emitting element LD may be connected to a second driving power line VSSL through which the second driving power source VSS is supplied. The light emitting element LD generates light with a predetermined luminance, corresponding to an amount of current supplied from a first transistor T1.

In an embodiment, the light emitting element LD may be an organic light emitting diode including an organic emitting layer. In another embodiment, the light emitting element LD may be an inorganic light emitting element formed of an inorganic material. Alternatively, the light emitting element LD may have a form in which inorganic light emitting elements are connected in parallel and/or series between the second driving power line VSSL and the fourth node N4.

A first electrode of the first transistor T1 (or driving transistor) may be connected to a second node N2, and a second electrode of the first transistor T1 may be connected to a third node N3. A gate electrode of the first transistor T1 may be connected to a first node N1. The first transistor T1 may control a driving current flowing from a first driving power line VDDL to the second driving power line VSSL via the light emitting element LD, corresponding to a voltage of the first node N1. The first driving power line VDDL may be set to a voltage higher than that of the second driving power line VSSL.

A second transistor T2 may be connected between the jth data line DLj and the second node N2. A gate electrode of the second transistor T2 may be connected to an ith scan line SLi. The second transistor T2 may be turned on by a gate-on level of a scan signal supplied to the ith scan line SLi, to electrically connect the jth data line DLj and the second node N2 to each other.

A third transistor T3 may be connected between the first electrode of the light emitting element LD (i.e., the fourth node N4) and a power line PL through which the initialization voltage Vint is supplied. A gate electrode of the third transistor T3 may be connected to the ith scan line SLi. The third transistor T3 may be turned on by the gate-on level of the scan signal supplied to the ith scan line SLi, to supply the initialization voltage Vint to the first electrode of the light emitting element LD (i.e., the fourth node N4).

A fourth transistor T4 may be connected between the first node N1 and the power line PL. A gate electrode of the fourth transistor T4 may be turned on by a gate-on level of a scan signal supplied to an (i−1)th scan line SLi−1, to supply the initialization voltage Vint to the first node N1.

A fifth transistor T5 may be connected between the first driving power line VDDL through which the first driving power source VDD is supplied and the second node N2. A gate electrode of the fifth transistor T5 may be connected to an ith emission control line Ei. The fifth transistor T5 may be turned on by a gate-on level of an emission control signal supplied to the ith emission control line Ei.

A sixth transistor T6 may be connected between the second electrode of the first transistor T1 (i.e., the third node N3) and the first electrode of the light emitting element LD (i.e., the fourth node N4). A gate electrode of the sixth transistor T6 may be connected to the ith emission control line Ei. The sixth transistor T6 may be turned on by the gate-on level of the emission control signal supplied to the ith emission control line Ei. Therefore, the fifth transistor T5 and the sixth transistor T6 may be simultaneously controlled.

A seventh transistor T7 may be connected between the second electrode of the first transistor T1 (i.e., the third node N3) and the first node N1. A gate electrode of the seventh transistor T7 may be connected to the ith scan line SLi. The seventh transistor T7 may be turned on by the gate-on level of the scan signal supplied to the ith scan line SLi, to electrically connect the second electrode of the first transistor T1 and the first node N1 to each other. When the seventh transistor T7 is turned on, the first transistor T1 may be connected in a diode form.

The storage capacitor Cst may be connected between the first driving power line VDDL and the first node N1.

Additionally, the scan line to which the transistors T2, T3, T4, and T7 are connected may be variously changed. In an example, the fourth transistor T4 may be driven by being connected to a separate scan line instead of the (i−1)th scan line SLi−1. Similarly, the third transistor T3 may also be driven by being connected to a separate scan line instead of the ith scan line Si.

Figure 4A:
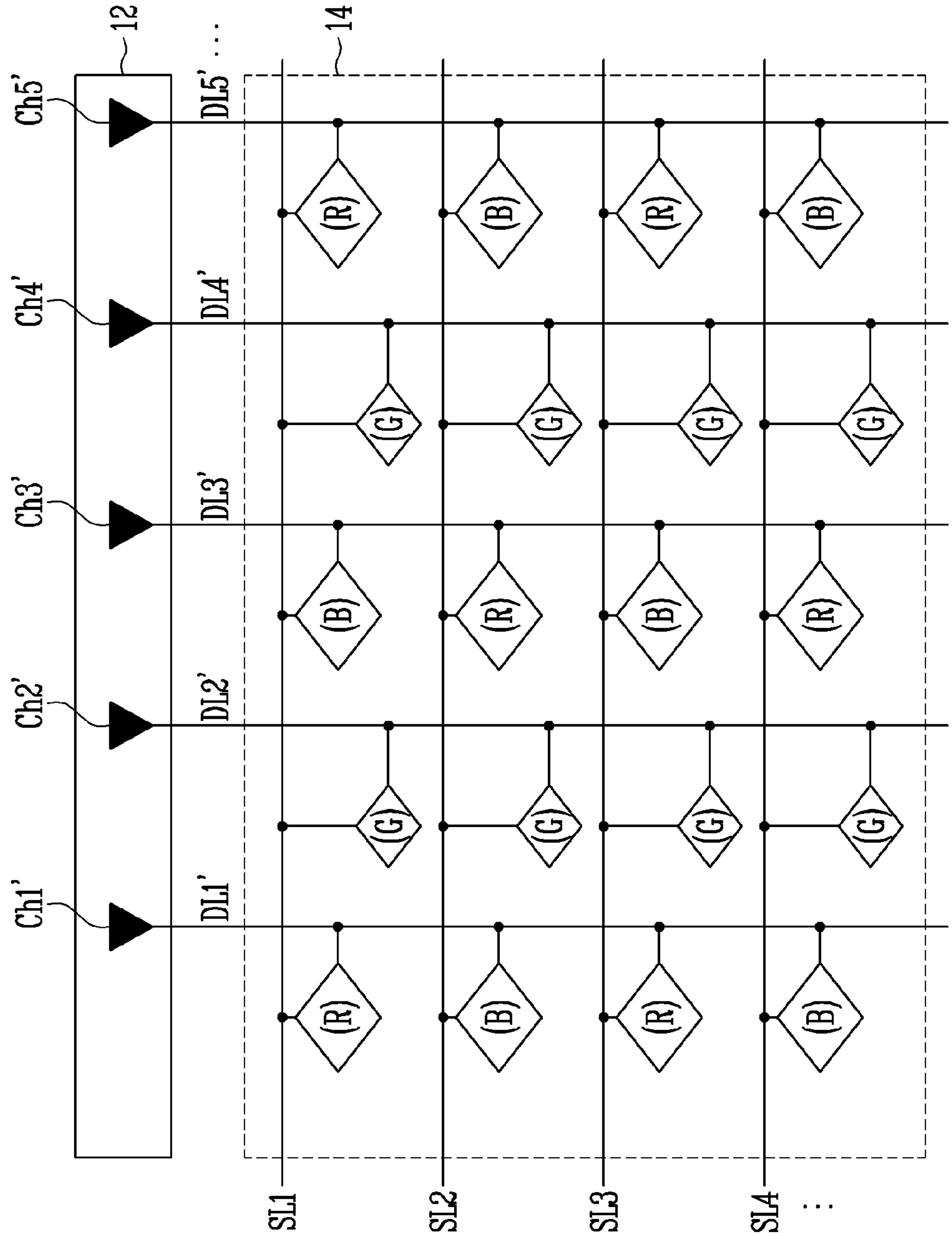
FIGS. 4A and 4B are diagrams illustrating examples of the data driver and the pixel unit, which are shown in FIG. 1, in accordance with one or more embodiments.
Figure 4B:
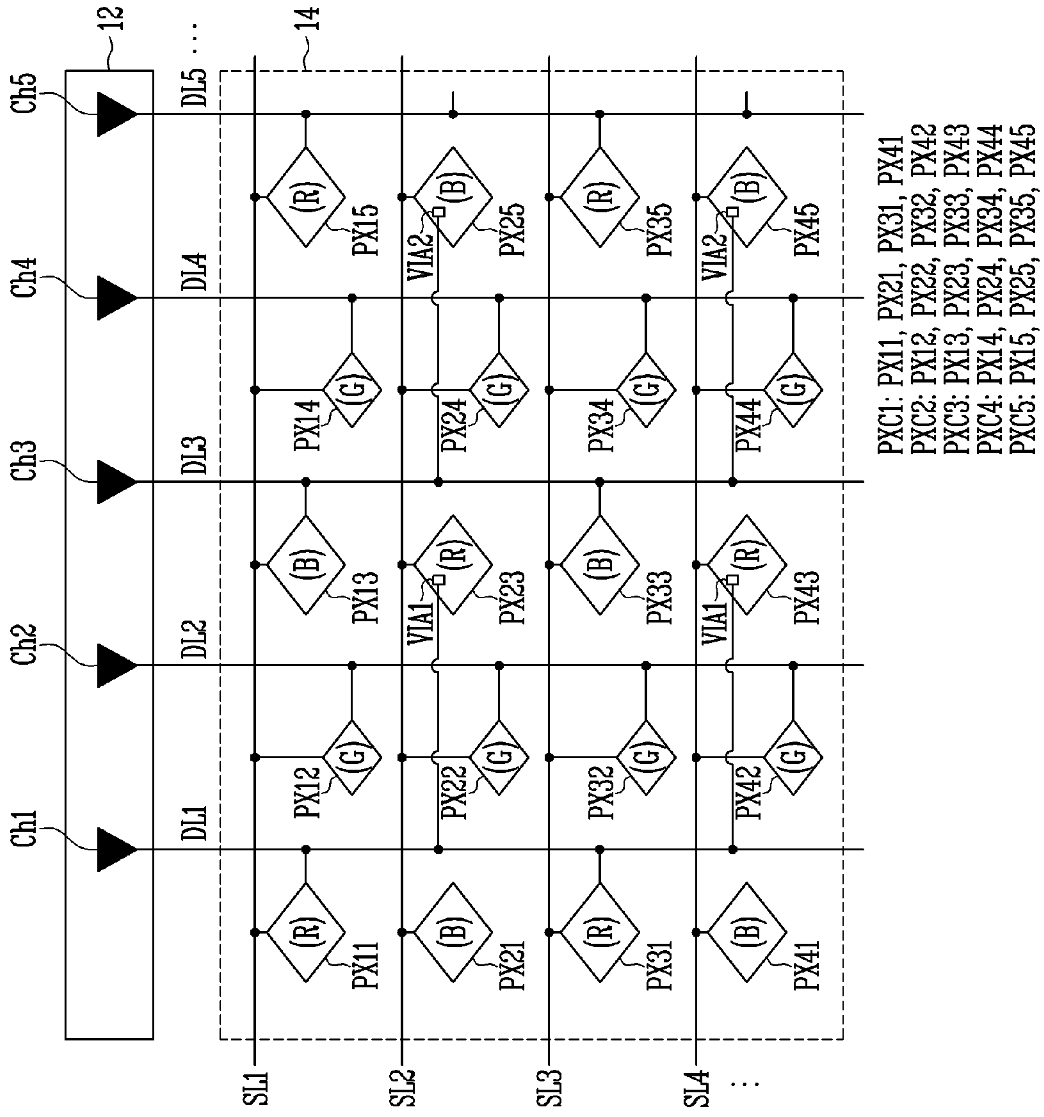
Figure 5A:
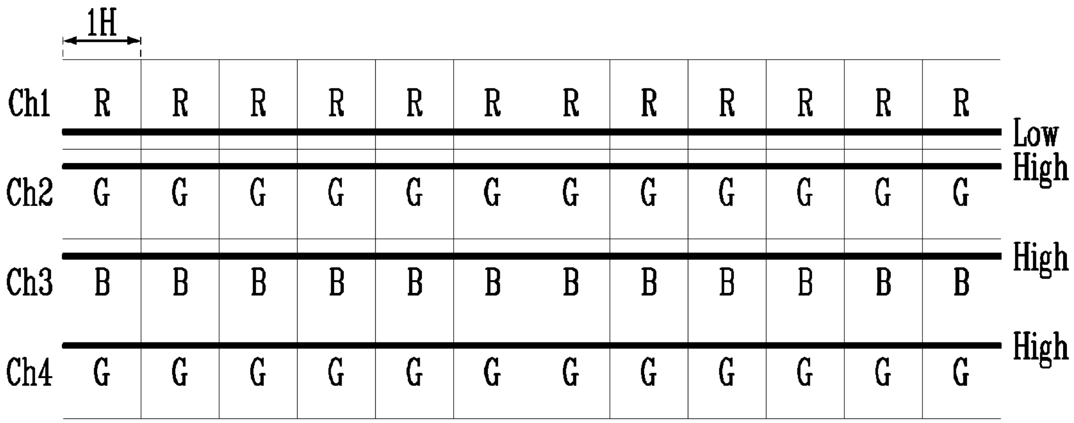
FIGS. 5A, 5B, and 5C are diagrams illustrating an effect of the embodiment shown in FIG. 4B.
Figure 5B:
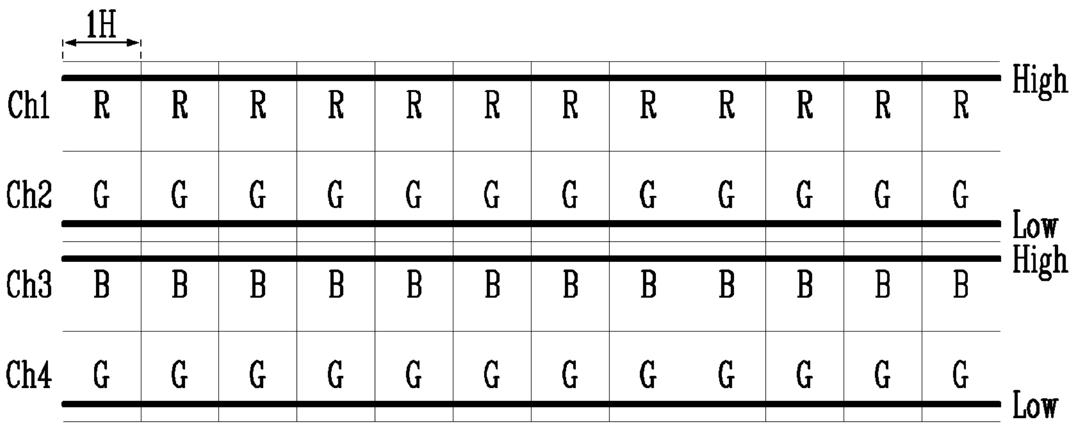
Figure 5C:
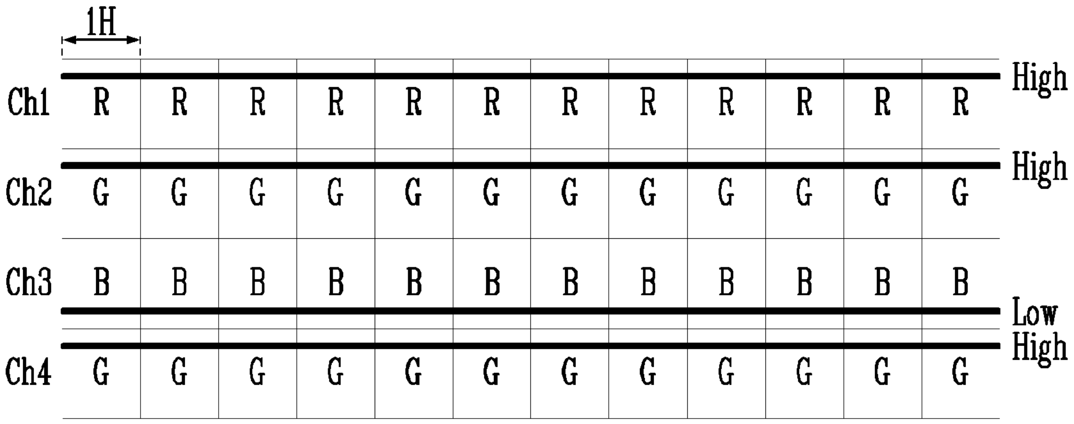

FIGS. 4A and 4B are diagrams illustrating examples of the data driver and the pixel unit, which are shown in FIG. 1, in accordance with one or more embodiments. FIGS. 5A to 5C are diagrams illustrating an effect of the embodiment shown in FIG. 4B.

Referring to FIGS. 1 and 4A, the display device 1 may include a data driver 12 which supplies a data signal to each of data lines DL1' to DL5' and a pixel unit 14 including sub-pixels PXij emitting lights of a plurality of colors, i.e., red R, green G, and blue B.

In the pixel unit 14, the sub-pixels PXij emitting lights of the red R, the green G, and the blue B may be arranged in a PENTILE™ pixel structure. In accordance with an embodiment, in the PENTILE™ pixel structure, sub-pixels PXij emitting light of the red R and the blue B may be alternately connected to the same data lines (e.g., DL1', DL3', and DL5') along an extending direction of the data lines DL1' to DL5', and sub-pixels PXij emitting light of the green G may be consecutively connected to the same data lines (e.g., DL2' and DL4') along the extending direction of the data lines DL1' to DL5'.

The data driver 12 may include a plurality of source channels Ch1' to Ch5'. The source channels Ch1' to Ch5' may be respectively connected one-to-one to the data lines DL1' to DL5'. 2'th and 4'th source channels Ch2' and Ch4' may be set to output only a data signal of one color, and 1'th, 3'th, and 5'th source channels Ch1', Ch3', and Ch5' may be set to alternately output data signals of two colors. For example, the 2'th and 4'th source channels Ch2' and Ch4' may supply only a green data signal to the data lines (e.g., DL2' and DL4') to which the sub-pixels PXij emitting light of the green G are connected for every one horizontal period, and the 1'th, 3'th, and 5'th source channels Ch1', Ch3', and Ch5' may alternately supply a green data signal and a blue data signal, which have different voltage levels, to the data lines (e.g., DL1', DL3', and DL5') to which the sub-pixels PXij emitting lights of the red R and the blue B are connected for every one horizontal period.

Therefore, since the 1'th, 3'th, and 5'th source channels Ch1', Ch3', and Ch5' are to be alternately supply the green data signal and the blue data signal, which have different voltage levels, to the data lines (e.g., DL1', DL3', and DL5') to which the sub-pixels PXij emitting lights of the red R and the blue B are connected for every one horizontal period, peak current is increased whenever the voltage level of a data signal is changed. As a result, there occurs a problem that power consumption increases.

In order to solve this problem, in addition to second and fourth source channels Ch2 and Ch4, first, third, and fifth source channels Ch1, Ch3, and Ch5 may also be set to output only a data signal of one color as shown in FIG. 4B.

Like the embodiment shown in FIG. 4A, in a pixel unit 14, sub-pixels PXij emitting lights of the red R, the green G, and the blue B may be arranged in a PENTILE™ pixel structure. An eleventh sub-pixel PX11, a twelfth sub-pixel PX12, a thirteenth sub-pixel PX13, a fourteenth sub-pixel PX14, and a fifteenth sub-pixel PX15, which are disposed on a first pixel row, may be connected to a first scan line SL1. A twenty-first sub-pixel PX21, a twenty-second sub-pixel PX22, a twenty-third sub-pixel PX23, a twenty-fourth sub-pixel PX24, and a twenty-fifth sub-pixel PX25, which are disposed on a second pixel row, may be connected to a second scan line SL2. A thirty-first sub-pixel PX31, a thirty-second sub-pixel PX32, a thirty-third sub-pixel PX33, a thirty-fourth sub-pixel PX34, and a thirty-fifth sub-pixel PX35, which are disposed on a third pixel row, may be connected to a third scan line SL3. A forty-first sub-pixel PX41, a forty-second sub-pixel PX42, a forty-third sub-pixel PX43, a forty-fourth sub-pixel PX44, and a forty-fifth sub-pixel PX45, which are disposed on a fourth pixel row, may be connected to a fourth scan line SL4. A data signal supplied to data lines DL1 to DL5 from a data driver 12 may be supplied to be synchronization with a scan signal sequentially supplied to the scan lines SL1 to SL4.

The data driver 12 may include a plurality of source channels Ch1 to Ch5. The source channels Ch1 to Ch5 may be respectively connected one-to-one to the data lines DL1 to DL5. Each of the source channels Ch1 to Ch5 may be set to output only a data signal of one color.

In accordance with an embodiment, a first source channel Ch1 connected to a first data line DL1 may provide a data signal of a first color, a second source channel Ch2 connected to a second data line DL2 may provide a data signal of a second color, a third source channel Ch3 connected to a third data line DL3 may provide a data signal of a third color, a fourth source channel Ch4 connected to a fourth data line DL4 may provide a data signal of the second color, and a fifth source channel Ch5 connected to a fifth data line DL5 may provide a data signal of the first color. The first color may be the red R, the second color may be the green G, and the third color may be the blue. Alternatively, the first color may be the blue B, the second color may be the green G, and the third color may be the red R. Each of the sub-pixels PXij may be configured with a light emitting element LD emitting light of a color corresponding to the data signal supplied from a corresponding data line among the data lines DL1 to DL5, which is connected thereto.

For example, the first source channel Ch1 may be connected to the first data line DL1. The first source channel Ch1 may output a red data signal to be supplied to sub-pixels PXij emitting light of the red R. To this end, the first data line DL1 may be connected to the eleventh sub-pixel PX11 and the thirty-first sub-pixel PX31 of a first pixel column PXC1. Also, the first data line DL1 is not connected to the twenty-first sub-pixel PX21 and the forty-first sub-pixel PX41 of the first pixel column PXC1, but may be connected to the twenty-third sub-pixel PX23 and the forty-third sub-pixel PX43 of a third pixel column PXC3 through a first contact hole VIA1. The first contact hole VIA1 may be provided in each of the sub-pixels PX23 and PX43 included in the third pixel column PXC3, and a second transistor T2 (see FIG. 3) of each of the sub-pixels PX23 and PX43 may be connected to the first data line DL1 through the first contact hole VIA1.

The second source channel Ch2 may be connected to the second data line DL2. The second source channel Ch2 may output a green data signal to be supplied to sub-pixels PXij emitting light of the green G. To this end, the second data line DL2 may be connected to the twelfth sub-pixel PX12, the twenty-second sub-pixel PX22, the thirty-second sub-pixel PX32, and the forty-second sub-pixel PX42 of a second pixel column PXC2.

The third source channel Ch3 may be connected to the third data line DL3. The third source channel Ch3 may output a blue data signal to be supplied to sub-pixels PXij emitting light of the blue B. To this end, the third data line DL3 may be connected to the thirteenth sub-pixel PX13 and the thirty-third sub-pixel PX33 of the third pixel column PXC3. Also, the third data line DL3 is not connected to the twenty-third sub-pixel PX23 and the forty-third sub-pixel PX43 of the third pixel column PXC3, but may be connected to the twenty-fifth sub-pixel PX25 and the forty-fifth sub-pixel PX45 of a fifth pixel column PXC5 through a second contact hole VIA2. The second contact hole VIA2 may be provided in each of the sub-pixels PX25 and PX45 included in the fifth pixel column PXC5, and a second transistor T2 (see FIG. 3) of each of the sub-pixels PX25 and PX45 may be connected to the third data line DL3 through the second contact hole VIA2.

The fourth source channel Ch4 may be connected to the fourth data line DL4. The fourth source channel Ch4 may output a green data signal to be supplied to sub-pixels PXij emitting light of the green G. To this end, the fourth data line DL4 may be connected to the fourteenth sub-pixel PX14, the twenty-fourth sub-pixel PX24, the thirty-fourth sub-pixel PX34, and the forty-fourth sub-pixel PX44 of a fourth pixel column PXC4.

The fifth source channel Ch5 may be connected to the fifth data line DL5. The fifth source channel Ch5 may output a red data signal to be supplied to sub-pixels PXij emitting light of the red R. To this end, the fifth data line DL5 may be connected to the fifteenth sub-pixel PX15 and the thirty-fifth sub-pixel PX35 of the fifth pixel column PXC5. In alternative implementations, the other source channels from the fifth source channel Ch5 may have a structure in which the first to fourth channels Ch1 to Ch4 are repeated.

Hereinafter, an effect of the embodiment shown in FIG. 4B will be described with reference to FIGS. 5A to 5C. For convenience of description, a pattern displayed on the display unit 14 is described by using an embodiment in which any one of a red R pattern, a green G pattern, and a blue B pattern of a maximum grayscale (e.g., grayscale 255) is displayed on the entire screen.

Referring to FIG. 5A, in order to display the red R pattern of the grayscale 255 on the pixel unit 14, in the display device 1 in accordance with the embodiment shown in FIG. 4B, the first source channel Ch1 may supply a red data signal corresponding to the grayscale 255 to the first data line DL1 for every one horizontal period 1H, the second and fourth source channels Ch2 and Ch4 may supply a green data signal corresponding to grayscale 0 respectively to the second and fourth data line DL2 and DL4 for every one horizontal period 1H, and the third source channel Ch3 may supply a blue data signal corresponding to the grayscale 0 to the third data line DL3 for every one horizontal period 1H.

Referring to FIG. 5B, in order to display the green G pattern of the grayscale 255 on the pixel unit 14, in the display device 1 in accordance with the embodiment shown in FIG. 4B, the first source channel Ch1 may supply a red data signal corresponding to the grayscale 0 to the first data line DL1 for every one horizontal period 1H, the second and fourth source channels Ch2 and Ch4 may supply a green data signal corresponding to the grayscale 255 respectively to the second and fourth data lines DL2 and DL4 for every one horizontal period 1H, and the third source channel Ch3 may supply a blue data signal corresponding to the grayscale 0 to the third data line DL3 for every one horizontal period 1H.

Referring to FIG. 5C, in order to display the blue B pattern of the grayscale 255 on the pixel unit 14, in the display device 1 in accordance with the embodiment shown in FIG. 4B, the first source channel Ch1 may supply a red data signal corresponding to the grayscale 0 to the first data line DL1 for every one horizontal period 1H, the second and fourth source channels Ch2 and Ch4 may supply a green data signal corresponding to the grayscale 0 respectively to the second and fourth data lines DL2 and DL4 for every one horizontal period 1H, and the third source channel Ch3 may supply a blue data signal corresponding to the grayscale 255 to the third data line DL3 for every one horizontal period 1H.

As described above, in the embodiment shown in FIG. 4B, the first source channel Ch1 supplies only a red data signal (e.g., a logic low level) having the same voltage level to the first data line DL1 to which only sub-pixels PXij emitting light of the red R are connected for every one horizontal period 1H so as to display the red R pattern on the pixel unit 14, and the third source channel Ch3 supplies only a blue data signal (e.g., a logic low level) having the same voltage level to the third data line DL3 to which only sub-pixels PXij emitting light of the blue B are connected for every one horizontal period 1H so as to display the blue B pattern on the pixel unit 14. Hence, an increase in power consumption due to toggling can be minimized, as compared with the embodiment shown in FIG. 4A, in which a red data signal (e.g., the logic low level) corresponding to the grayscale 255 and a blue data signal (e.g., the logic high level) corresponding to the grayscale 0 are to be alternately supplied for every one horizontal period 1H so as to display the red R pattern on the pixel unit 14, and a blue data signal (e.g., the logic low level) corresponding to the grayscale 255 and a red data signal (e.g., the logic high level) corresponding to the grayscale 0 are to be alternately supplied for every one horizontal period 1H so as to display blue B pattern on the display unit 14.

However, referring back to FIG. 4B, since the twenty-first sub-pixel PX21 and the forty-first sub-pixel PX41 of the first pixel column PXC1 have not been connected to any source channels Ch1 to Ch5 (or any data lines DL1 to DL5), the twenty-first sub-pixel PX21 and the forty-first sub-pixel PX41 do not receive any data signal even when a scan signal is supplied to each of the twenty-first sub-pixel PX21 and the forty-first sub-pixel PX41 through the second and fourth scan lines SL2 and SL4. Therefore, a user of the display device 1 (see FIG. 1) may recognize, as defective pixels, the twenty-first sub-pixel PX21 and the forty-first sub-pixel PX41.

Hereinafter, a method for solving this problem will be described with reference to FIGS. 6 to 8C.

Figure 6:
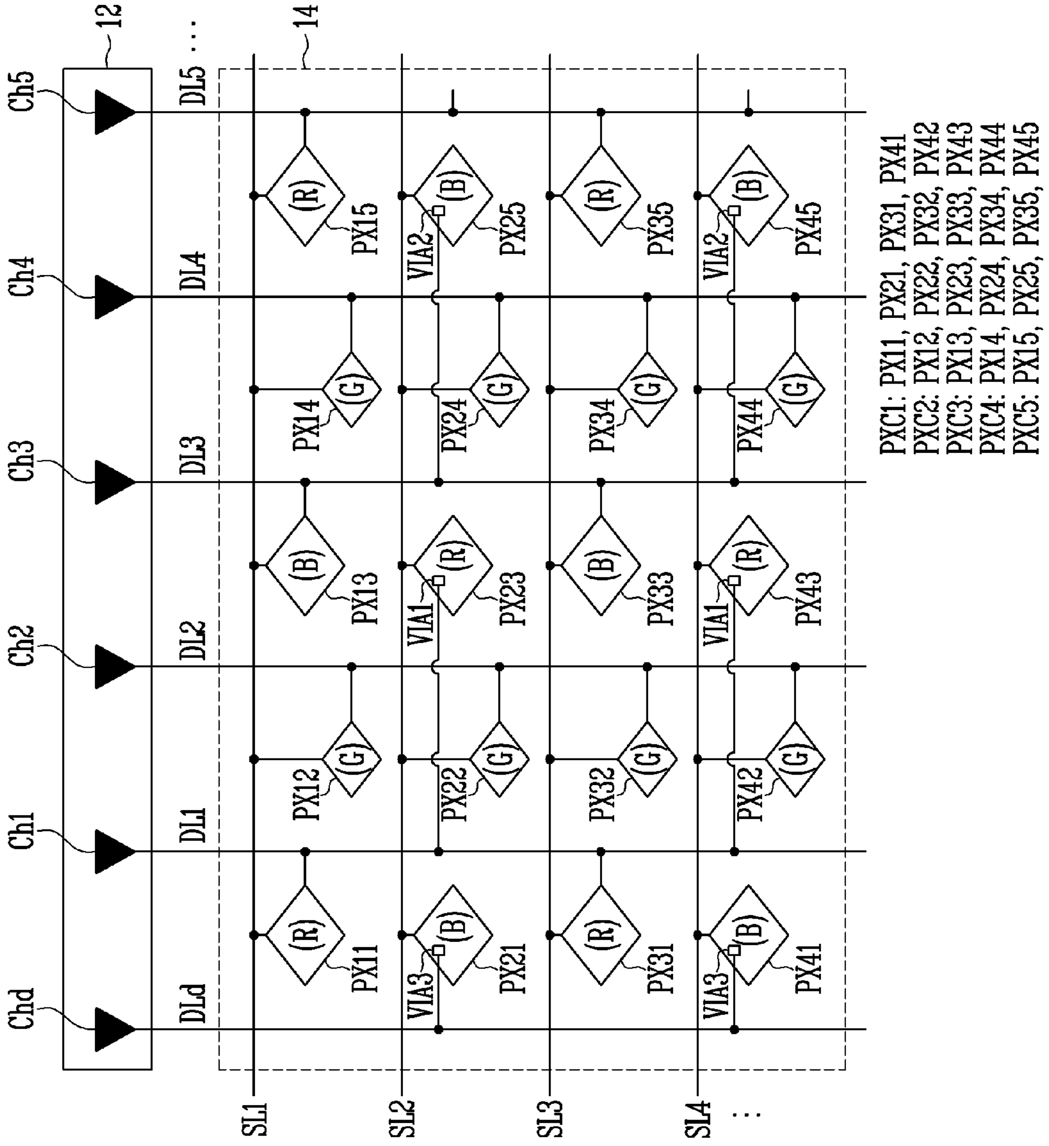
FIG. 6 is a diagram illustrating an example of the data driver and the pixel unit, which are shown in FIG. 1, in accordance with an embodiment.
Figure 7A:
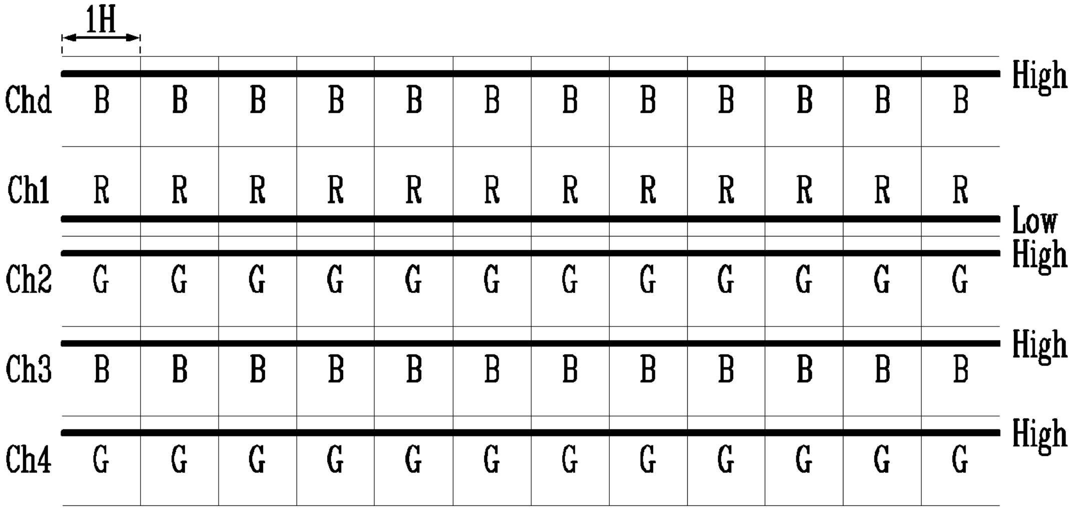
FIGS. 7A, 7B, and 7C are diagrams illustrating an effect of the embodiment shown in FIG. 6.
Figure 7B:
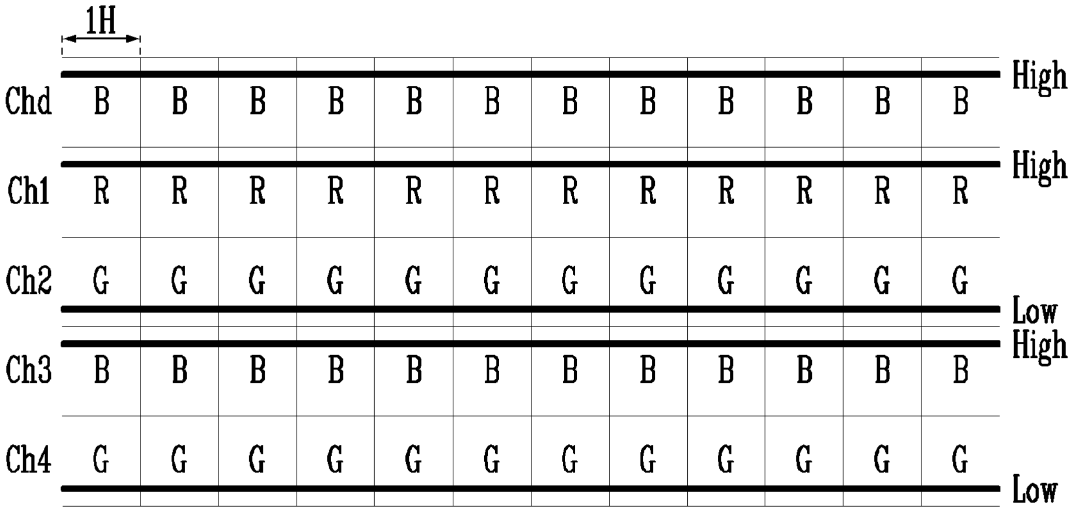
Figure 7C:
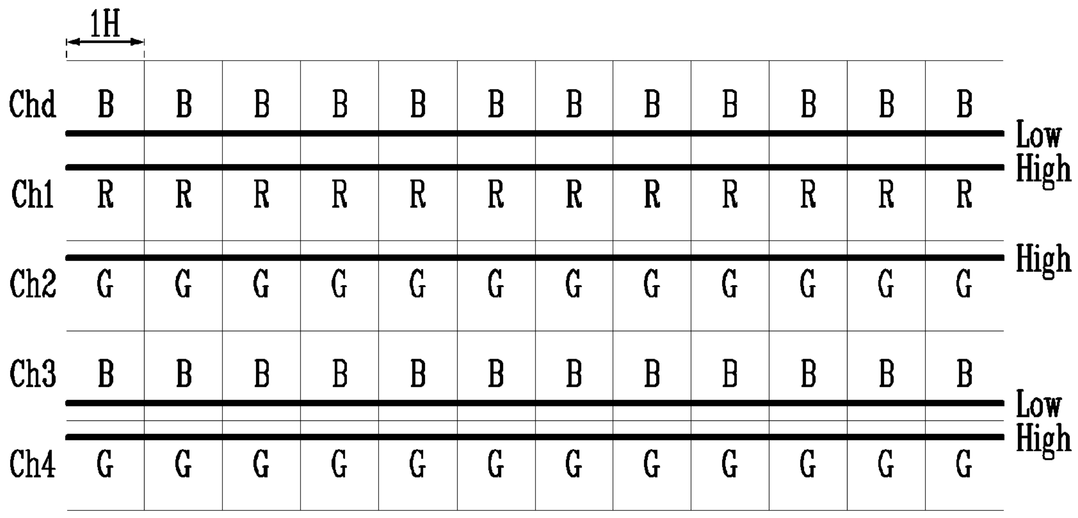

FIG. 6 is a diagram illustrating an example of the data driver and the pixel unit, which are shown in FIG. 1, in accordance with an embodiment. FIGS. 7A to 7C are diagrams illustrating an effect of the embodiment shown in FIG. 6.

The embodiment shown in FIG. 6 is different from the embodiment shown in FIG. 4B, in which a dummy source channel Chd and a dummy data line DLd are not included, in that the dummy source channel Chd and the dummy data line DLd are further included, and sub-pixels (e.g., PX21 and PX41) and the dummy data line DLd are connected to each other through a contact hole (e.g., a third contact hole VIA3). Hereinafter, overlapping descriptions will be omitted, and portions different from those of the embodiment shown in FIG. 4B will be mainly described for ease in explanation of the embodiments.

Specifically, referring 1, 4B, and 6, a data driver 12 may include a plurality of source channels Ch1 to Ch5. The source channels Ch1 to Ch5 may be respectively connected one-to-one to data lines DL1 to DL5. Each of the source channels Ch1 to Ch5 may be set to output only a data signal of one color. A data signal supplied to the data lines DL1 to DL5 may be supplied to be synchronized with a scan signal sequentially supplied to scan lines SL1 to SL4.

In accordance with an embodiment, a first source channel Ch1 connected to a first data line DL1 may provide a data signal of a first color, a second source channel Ch2 connected to a second data line DL2 may provide a data signal of a second color, a third source channel Ch3 connected to a third data line DL3 may provide a data signal of a third color, a fourth source channel Ch4 connected to a fourth data line DL4 may provide a data signal of the second color, and a fifth source channel Ch5 connected to a fifth data line DL5 may provide a data signal of the first color. The first color may be red R, the second color may be green G, and the third color may be blue B. Alternatively, the first color may be the blue B, the second color may be the green G, and the third color may be the red R. Each of sub-pixels PXij may be configured with a light emitting element LD emitting light of a color corresponding to a data signal supplied from a corresponding data line among the data lines DL1 to DL5, which is connected thereto.

The data driver 12 may include a dummy source channel Chd. The dummy source channel Chd may be connected to a dummy data line DLd. The dummy source channel Chd may supply a data signal of the third color when a source channel (e.g., the first source channel Ch1) disposed adjacent to the dummy source channel Chd supplies a data signal of the first color. The dummy source channel Chd may supply a data signal of the first color when a source channel (e.g., the first source channel Ch1) disposed adjacent to the dummy source channel Chd supplies a data signal of the third color. For example, the dummy source channel Chd may supply a blue data signal when the first source channel Ch1 supplies a red data signal. On the contrary, the dummy source channel Chd may supply a red data signal when the first source channel Ch1 supplies a blue data signal.

In a pixel unit 14, sub-pixels PXij emitting lights of a plurality of colors, i.e., the red R, the green G, and the blue B may be arranged in a PENTILE™ pixel structure. The pixel unit 14 may further include a dummy data line DLd at the outside of a data line (e.g., the first data line DL1) of a first column.

In accordance with an embodiment, in the pixel unit 14, the first data line DL1 may be connected to sub-pixels PX11 and PX31 disposed on odd-numbered pixel rows among sub-pixels PX11, PX21, PX31, and PX41 disposed on a first pixel column PXC1, and be connected to sub-pixels PX23 and PX43 disposed on even-numbered pixel rows among sub-pixels PX13, PX23, PX33, and PX433 disposed on a third pixel column PXC3. In addition, the second data line DL2 may be connected to all sub-pixels PX12, PX22, PX32, and PX43 disposed on a second pixel column PXC2, and the fourth data line DL4 may be connected to all sub-pixels PX14, PX24, PX34, and PX44 disposed on a fourth pixel column PXC4. In addition, the third data line DL3 may be connected to sub-pixels PX13 and PX33 disposed on the odd-numbered pixel rows among the sub-pixels PX13, PX23, PX33, PX43 disposed on the third pixel column PXC3, and be connected to sub-pixels PX25 and PX45 disposed on the even-numbered pixel rows among sub-pixels PX15, PX25, PX35, and PX45 disposed on a fifth pixel column PXC5.

The dummy data line DLd may be connected to sub-pixels PX21 and PX41 disposed on the even-numbered pixel rows among the sub-pixels PX11, PX21, PX31, and PX41 disposed on the first pixel column PXC1. An effect of the embodiment shown in FIG. 6 will be described with reference to FIGS. 7A to 7C. For convenience of description, a pattern displayed on the display unit 14 is described by using an embodiment in which any one of a red R pattern, a green G pattern, and a blue B pattern of a maximum grayscale (e.g., grayscale 255) is displayed on the entire screen.

Referring to FIG. 7A, in order to display the red R pattern of the grayscale 255 on the pixel unit 14, in the display device 1 in accordance with the embodiment shown in FIG. 6, the first source channel Ch1 may supply a red data signal corresponding to the grayscale 255 to the first data line DL1 for every one horizontal period 1H, the second and fourth source channels Ch2 and Ch4 may supply a green data signal corresponding to grayscale 0 respectively to the second and fourth data line DL2 and DL4 for every one horizontal period 1H, and the third source channel Ch3 may supply a blue data signal corresponding to the grayscale 0 to the third data line DL3 for every one horizontal period 1H. The dummy source channel Chd may supply a blue data signal corresponding to the grayscale 0 to the dummy data line DLd for every one horizontal period 1H.

Referring to FIG. 7B, in order to display the green G pattern of the grayscale 255 on the pixel unit 14, in the display device 1 in accordance with the embodiment shown in FIG. 6, the first source channel Ch1 may supply a red data signal corresponding to the grayscale 0 to the first data line DL1 for every one horizontal period 1H, the second and fourth source channels Ch2 and Ch4 may supply a green data signal corresponding to the grayscale 255 respectively to the second and fourth data lines DL2 and DL4 for every one horizontal period 1H, and the third source channel Ch3 may supply a blue data signal corresponding to the grayscale 0 to the third data line DL3 for every one horizontal period 1H. The dummy source channel Chd may supply a blue data signal corresponding to the grayscale 0 to the dummy data line DLd for every one horizontal period 1H.

Referring to FIG. 7C, in order to display the blue B pattern of the grayscale 255 on the pixel unit 14, in the display device 1 in accordance with the embodiment shown in FIG. 6, the first source channel Ch1 may supply a red data signal corresponding to the grayscale 0 to the first data line DL1 for every one horizontal period 1H, the second and fourth source channels Ch2 and Ch4 may supply a green data signal corresponding to the grayscale 0 respectively to the second and fourth data lines DL2 and DL4 for every one horizontal period 1H, and the third source channel Ch3 may supply a blue data signal corresponding to the grayscale 255 to the third data line DL3 for every one horizontal period 1H. The dummy source channel Chd may supply a blue data signal corresponding to the grayscale 225 to the dummy data line DLd for every 1 horizontal period 1H.

As described above, in a process of connecting sub-pixels PXij disposed on different pixel columns PXC1 to PXC5 to one of the data lines DL1 to DL5 so as to supply only a data signal of one color to each of the source channels Ch1 to Ch5, sub-pixels (e.g., PX21 and PX41) which is not connected to the one data line are also connected to the dummy data line DLd which is supplied with a data signal (e.g., a blue data signal) from the dummy source channel Chd, to emit light while an input image is displayed. Therefore, a pixel defect can be prevented while reducing power consumption of the display device 1, thereby improving display quality.

Figure 8A:
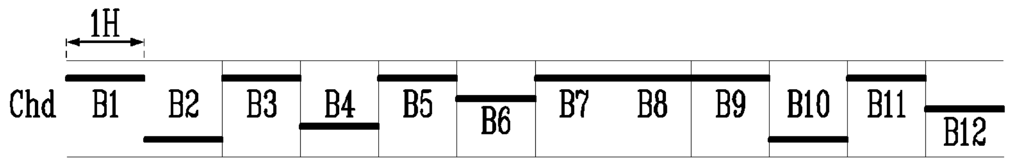
FIGS. 8A, 8B, and 8C are diagrams illustrating a data signal supplied to a dummy data line.
Figure 8B:
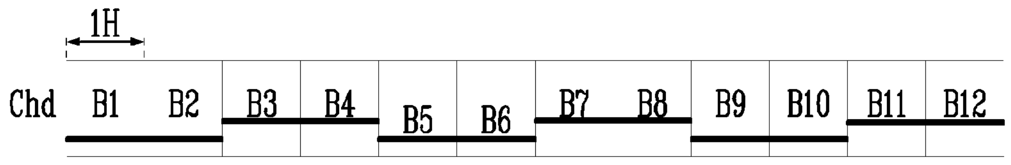
Figure 8C:
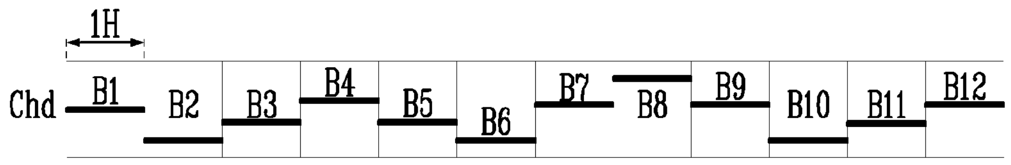

FIGS. 8A to 8C are diagrams illustrating a data signal supplied to the dummy data line.

Referring to FIGS. 1, 6, and 8A to 8C, the dummy source channel Chd may supply a data signal (e.g., a blue data signal) corresponding to the grayscale 255 as shown in FIGS. 7A to 7C. However, the dummy source channel Chd may supply data signals corresponding to different grayscale values for every one horizontal period 1H, based on RGB data RGB.

Referring to FIG. 6, the dummy data line DLd is connected to sub-pixels (e.g., PX21 and PX41) disposed on the even-numbered pixel rows, but is not connected to sub-pixels (e.g., PX11 and PX31) disposed on the odd-numbered pixel rows. Therefore, data B1, B3, B5, B7, B9, and B11 corresponding to the odd-numbered pixel rows are not actually applied to any sub-pixel PXij. That is, in a data signal supplied from the dummy source channel Chd, only data B2, B4, B6, B8, B10, and B12 corresponding to the even-numbered pixel row may be actually used to allow the sub-pixels (e.g., PX21 and PX41) to emit light.

Referring to FIG. 8A, in the data signal provided from the dummy source channel Chd, the data driver 12 may generate the data B2, B4, B6, B8, B10, and B12 corresponding to the even-numbered pixel rows, based on the RGB data RGB, and set the data B1, B3, B5, B7, B9, and B11 corresponding to the odd-numbered pixel rows to have a voltage level (or black data) corresponding to the grayscale 0.

Referring to FIG. 8B, in the data signal provided from the dummy source channel Chd, the data driver 12 may generate the data B2, B4, B6, B8, B10, and B12 corresponding to the even-numbered pixel rows, based on the RGB data RGB, and set the data B1, B3, B5, B7, B9, and B11 corresponding to the odd-numbered pixel rows to have a voltage level equal to that of the data corresponding to the even-numbered pixel rows.

Referring to FIG. 8C, in the data signal provided from the dummy source channel Chd, the data driver 12 may generate the data B2, B4, B6, B8, B10, and B12 corresponding to the even-numbered pixel rows, based on the RGB data RGB, and set the data B1, B3, B5, B7, B9, and B11 corresponding to the odd-numbered pixel rows to have a voltage level as a median value of voltage levels of data corresponding to adjacent even-numbered pixel rows. Although a case where data B1 corresponding to the first pixel row has a voltage level corresponding to a median grayscale (e.g., grayscale 128) has been illustrated in FIG. 8C, the data B1 corresponding to the first pixel row may have an arbitrary voltage level. For example, the data B1 corresponding to the first pixel row may have a voltage level corresponding to a minimum grayscale (e.g., the grayscale 0).

Hereinafter, other embodiments will be described. In the following embodiments, descriptions of portions identical to those of the above-described embodiment will be omitted or simplified, and portions different from those of the above-described embodiment will be mainly described for ease in explanation of these other embodiments.

Figure 9A:
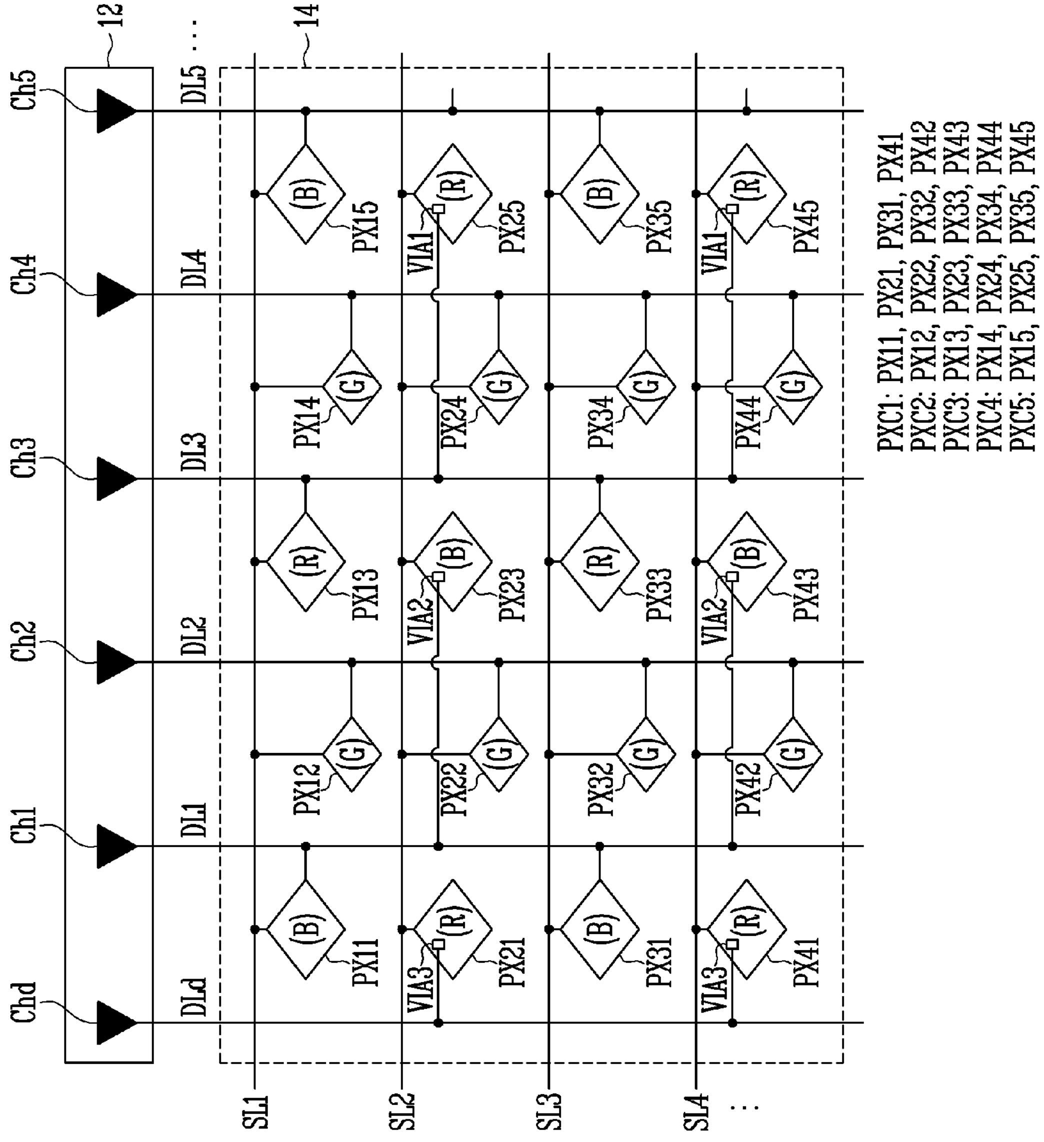
FIGS. 9A, 9B, and 9C are diagrams illustrating examples of the data driver and the pixel unit, which are shown in FIG. 1, in accordance with other embodiments.
Figure 9B:
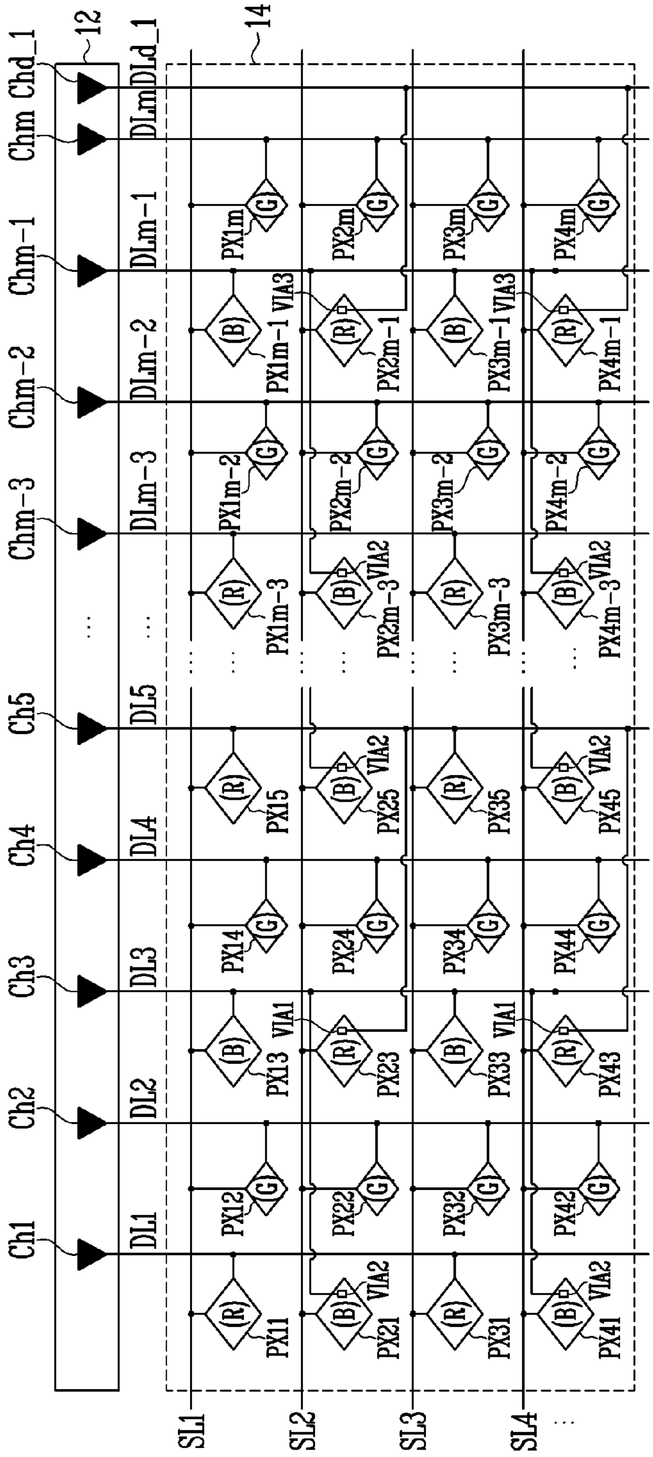
Figure 9C:
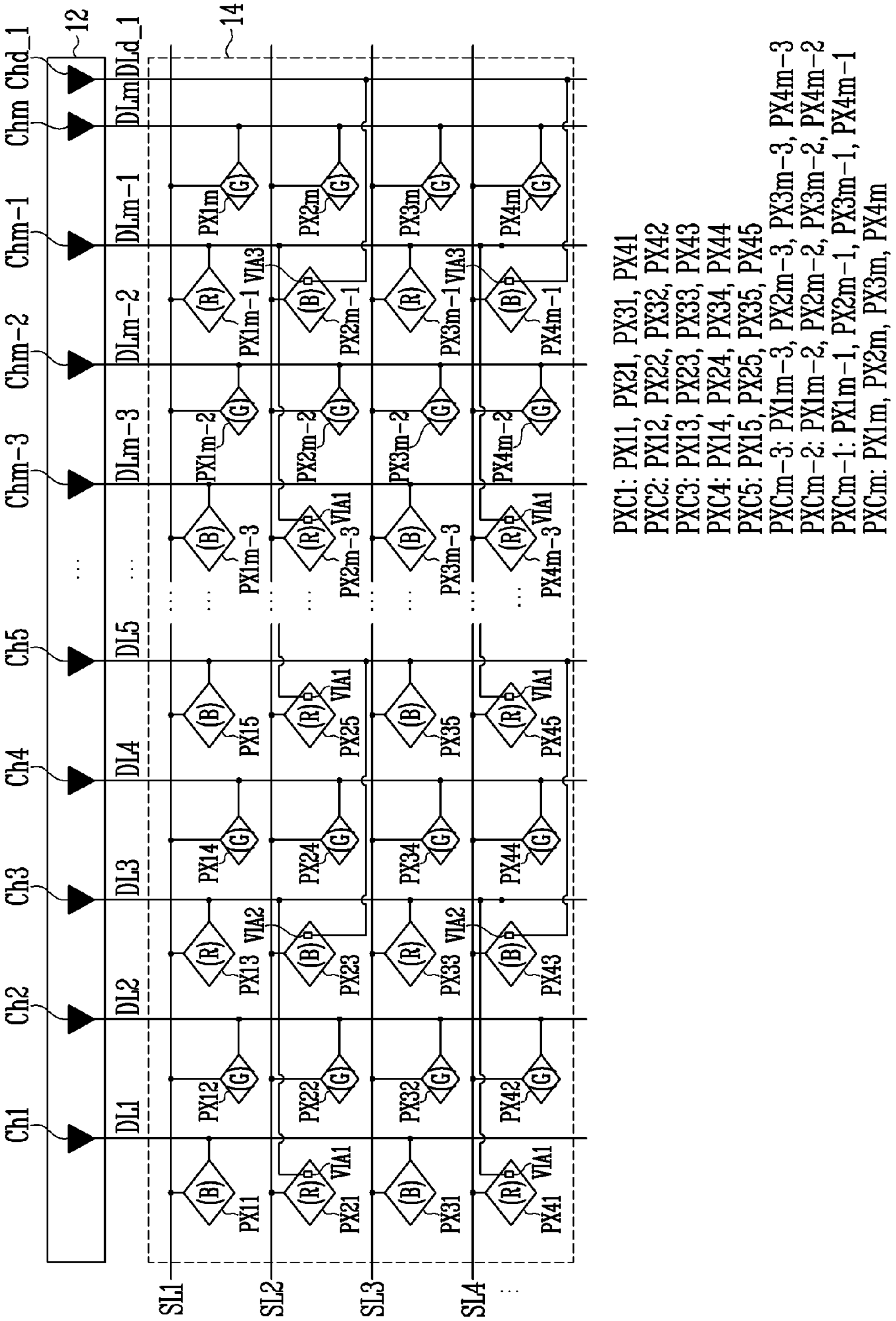

FIGS. 9A to 9C are diagrams illustrating examples of the data driver and the pixel unit, which are shown in FIG. 1, in accordance with other embodiments.

The embodiment shown in FIG. 9A is different from the embodiment shown in FIG. 6, in that the positions of a sub-pixel PXij (see FIG. 1) emitting light of the red R and a sub-pixel PXij (see FIG. 1) emitting light of the blue B are reversed.

A dummy source channel Chd supplies a data signal of the third color when a source channel (e.g., the first source channel Ch1) adjacent to the dummy source channel Chd supplies a data signal of the first color, and supplies a data signal of the first color when the source channel (e.g., the first source channel Ch1) adjacent to the dummy source channel Chd supplies a data signal of the third color. Therefore, the dummy source channel Chd of the embodiment shown in FIG. 9A may supply a data signal of the third color when the dummy source channel Chd of the embodiment shown in FIG. 6 supplies a data signal of the first color, and supply a data signal of the first color when the dummy source channel Chd of the embodiment shown in FIG. 6 supplies a data signal of the third color. For example, the dummy source channel Chd shown in FIG. 9A may supply a blue data signal when the dummy source channel Chd supplies a red data signal. On the contrary, the dummy source channel Chd shown in FIG. 9A may supply a red data signal when the dummy source channel Chd supplies a blue data signal. A third contact hole VIA3 may be simultaneously formed with a first contact hole VIA1.

The embodiment shown in FIG. 9B is different from the embodiment shown in FIG. 6, in which the dummy source channel Chd and the dummy data line DLd are respectively disposed adjacent to the first source channel Ch1 and the first data line DL1, in that a dummy source channel Chd_1 and a dummy data line DLd_1 are respectively disposed adjacent to an mth source channel Chm and an mth data line DLm.

Specifically, referring to FIGS. 1 and 9B, in the pixel unit 14, sub-pixels PXij emitting lights of a plurality of colors, i.e., red R, green G, and blue B are arranged in a PENTILE™ pixel structure. An eleventh sub-pixel PX11, a twelfth sub-pixel PX12, a thirteenth sub-pixel PX13, a fourteenth sub-pixel PX14, a fifteenth sub-pixel PX15, . . . , a (1m−3)th sub-pixel PX1*m*−3, a (1m−2)th sub-pixel PX1*m*−2, a (1m−1)th sub-pixel PX1*m*−1, and a 1mth sub-pixel PX1*m*, which are disposed on a first pixel row, may be connected to a first scan line SL1. A twenty-first sub-pixel PX21, a twenty-second sub-pixel PX22, a twenty-third sub-pixel PX23, a twenty-fourth sub-pixel PX24, a twenty-fifth sub-pixel PX25, . . . , a (2m−3)th sub-pixel PX2*m*−3, a (2m−2)th sub-pixel PX2*m*−2, a (2m−1)th sub-pixel PX2*m*−1, and a 2mth sub-pixel PX2*m*, which are disposed on a second pixel row, may be connected to a second scan line SL2. A thirty-first sub-pixel PX31, a thirty-second sub-pixel PX32, a thirty-third sub-pixel PX33, a thirty-fourth sub-pixel PX34, a thirty-fifth sub-pixel PX35, . . . , a (3m−3)th sub-pixel PX3*m*−3, a (3m−2)th sub-pixel PX3*m*−2, a (3m−1)th sub-pixel PX3*m*−1, and a 3mth sub-pixel PX3*m*, which are disposed on a third pixel row, may be connected to a third scan line SL3. A forty-first sub-pixel PX41, a forty-second sub-pixel PX42, a forty-third sub-pixel PX43, a forty-fourth sub-pixel PX44, a forty-fifth sub-pixel PX45, . . . a (4m−3)th sub-pixel PX4*m*−3, a (4m−2)th sub-pixel PX4*m*−2, a (4m−1)th sub-pixel PX4*m*−1, and a 4mth sub-pixel PX4*m*, which are disposed on a fourth pixel row, may be connected to a fourth scan line SL4. A data signal supplied to the data lines DL1 to DLm from a data driver 12 may be supplied to be synchronized with a scan signal sequentially supplied to the scan lines SL1 to SL4.

The data driver 12 may include a plurality of source channels Ch1 to Chm. The source channels Ch1 to Chm may be respectively connected one-to-one to the data lines DL1 to DLm. Each of the source channels Ch1 to Chm may be set to output only a data signal of one color.

In accordance with an embodiment, first, fifth, . . . , and (m−3)th source channels Ch1, Ch5, . . . , and Chm−3 connected to first, fifth, . . . , and (m−3)th data lines DL1, DL5, . . . , and DLm−3 may provide a data signal of a first color, second, fourth, . . . , (m−2)th, and mth source channels Ch2, Ch4, . . . , Chm−2, and Chm connected to second, fourth, . . . , (m−2)th, and mth data lines DL2, DL4, . . . , DLm−2, and DLm may provide a data signal of a second color, and third, . . . , and (m−1)th source channels Ch3, . . . , and Chm−1 connected to third, . . . , and (m−1)th data lines DL3, . . . , and DLm−1 may provide a data signal of a third color. The first color may be red R, the second color may be green G, and the third color may be blue B.

Alternatively, the first color may be the blue B, the second color may be the green G, and the third color may be the red R. Each of sub-pixels PXij may be configured with a light emitting element LD emitting light of a color corresponding to a data signal supplied from a corresponding data line among the data lines DL1 to DLm, that is connected thereto.

For example, the first source channel Ch1 may be connected to the first data line DL1. The first source channel Ch1 may output a red data signal to be supplied to sub-pixels PXij emitting light of the red R. To this end, the first data line DL1 may be connected to the eleventh sub-pixel PX11 and the thirty-first sub-pixel PX31 of a first pixel column PXC1

The second source channel Ch2 may be connected to the second data line DL2. The second source channel Ch2 may output a green data signal to be supplied to sub-pixels PXij emitting light of the green G. To this end, the second data line DL2 may be connected to the twelfth sub-pixel PX12, the twenty-second sub-pixel PX22, the thirty-second sub-pixel PX32, and the forty-second sub-pixel PX42 of a second pixel column PXC2.

The third source channel Ch3 may be connected to the third data line DL3. The third source channel Ch3 may output a blue data signal to be supplied to sub-pixels PXij emitting light of the blue B. To this end, the third data line DL3 may be connected to the thirteenth sub-pixel PX13 and the thirty-third sub-pixel PX33 of a third pixel column PXC3. Also, the third data line DL3 is not connected to the twenty-third sub-pixel PX23 and the forty-third sub-pixel PX43 of the third pixel column PXC3, but may be connected to the twenty-first sub-pixel PX21 and the forty-first sub-pixel PX41 of the first pixel column PXC1 through a second contact hole VIA2. The second contact hole VIA2 may be provided in each of the sub-pixels PX21 and PX41 included in the first pixel column PXC1, and a second transistor T2 (see FIG. 3) of each of the sub-pixels PX21 and PX41 may be connected to the third data line DL3 through the second contact hole VIA2.

The fourth source channel Ch4 may be connected to the fourth data line DL4. The fourth source channel Ch4 may output a green data signal to be supplied to sub-pixels PXij emitting light of the green G. To this end, the fourth data line DL4 may be connected to the fourteenth sub-pixel PX14, the twenty-fourth sub-pixel PX24, the thirty-fourth sub-pixel PX34, and the forty-fourth sub-pixel PX44.

The fifth source channel Ch5 may be connected to the fifth data line DL5. The fifth source channel Ch5 may output a red data signal to be supplied to sub-pixels PXij emitting light of the red R. To this end, the fifth data line DL5 may be connected to the fifteenth sub-pixel PX15 and the thirty-fifth sub-pixel PX35 of a fifth pixel column PXC5. Also, the fifth data line DL5 is not connected to the twenty-fifth sub-pixel PX25 and the forty-fifth sub-pixel PX45 of the fifth pixel column PXC5, but may be connected to the twenty-third sub-pixel PX23 and the forty-third sub-pixel PX43 of the third pixel column PXC3 through a first contact hole VIA1. The first contact hole VIA1 may be provided in each of the sub-pixels PX23 and PX43 included in the third pixel column PXC3, and a second transistor T2 (see FIG. 3) of each of the sub-pixels PX23 and PX43 may be connected to the fifth data line DL5 through the first contact hole VIA1.

The other source channels from the (m−3)th source channel Chm−3 may have a structure in which the first to fifth source channels Ch1 to Ch5 are repeated.

The data driver 12 may include a dummy source channel Chd_1. The dummy source channel Chd_1 may be connected to a dummy data line DLd_1. The dummy source channel Chd_1 may supply a data signal of the third color when a source channel (e.g., the (m−1)th source channel Chm−1) adjacent to the dummy source channel Chd_1, which supplies a data signal of the first color or the third color, supplies a data signal of the first color, and supply a data signal of the first color when the source channel (e.g., the (m−1)th source channel Chm−1) adjacent to the dummy source channel Chd_1 supplies a data signal of the third color. For example, the dummy source channel Chd_1 may supply a red data signal when the (m−1)th source channel Chm−1 supplies a blue data signal. On the contrary, the dummy source channel Chd_1 may supply a blue data signal when the (m−1)th source channel Chm−1 supplies a red data signal.

In the pixel unit 14, the sub-pixels PXij emitting lights of the plurality of colors, i.e., the red R, the green G, and the blue B may be arranged in the PENTILE™ pixel structure. The pixel unit 14 may further include one dummy data line DLd_1 at the outside of a data line (e.g., the mth data line DLm) of the last column among the data lines DL1 to DLm.

In accordance with an embodiment, the dummy source channel Chd_1 may be connected to the dummy data line DLd_1. The dummy source channel Chd_1 may output a data signal sub-pixels (e.g., PX**2*m*−1 and PX4*m*−1) which are not connected to the data lines DL1 to DLm. To this end, the dummy data line DLd_1 may be connected to the (2m−1)th sub-pixel PX2*m*−1 and the (4m−1)th sub-pixel PX4*m*−1 of an (m−1)th pixel column PXCm−1 through a third contact hole VIA3. The third contact hole VIA3 may be provided in each of the sub-pixels PX2*m*−1 and PX4*m*−1 included in the (m−1)th pixel column PXCm−1, and a second transistor T2 (see FIG. 3) of each of the sub-pixels PX2*m*−1 and PX4*m*−1 may be connected to the dummy data line DLd_1 through the third via hole VIA3. The third contact hole VIA3 may be simultaneously formed with the first contact hole VIA1**.

The embodiment shown in FIG. 9C is different from the embodiment shown in FIG. 9B, in that the positions of a sub-pixel PXij (see FIG. 1) emitting light of the red R and a sub-pixel PXij (see FIG. 1) emitting light of the blue B are reversed.

A dummy source channel Chd_1 supplies a data signal of the third color when a source channel (e.g., the (m−1)th source channel Chm−1) adjacent to the dummy source channel Chd_1 supplies a data signal of the first color, and supplies a data signal of the first color when the source channel (e.g., the (m−1)th source channel Chm−1) adjacent to the dummy source channel Chd_1 supplies a data signal of the third color. Therefore, the dummy source channel Chd_1 of the embodiment shown in FIG. 9C may supply a data signal of the third color when the dummy source channel Chd_1 of the embodiment shown in FIG. 9B supplies a data signal of the first color, and supply a data signal of the first color when the dummy source channel Chd_1 of the embodiment shown in FIG. 9B supplies a data signal of the third color. For example, the dummy source channel Chd_1 shown in FIG. 9C may supply a blue data signal when the dummy source channel Chd_1 shown in FIG. 9B supplies a red data signal. On the contrary, the dummy source channel Chd_1 shown in FIG. 9C may supply a red data signal when the dummy source channel Chd_1 shown in FIG. 9B supplies a blue data signal. A third contact hole VIA3 may be simultaneously formed with a second contact hole VIA2.

The embodiments shown in FIGS. 9A to 9C merely have differences between arrangements of components in design, but can expect the substantially same effect as the embodiment shown in FIG. 6.

In the embodiments described herein, the display device is provided with an additional data line while supplying only a data signal of one color to one data line in a PENTILE™ pixel structure, so that a pixel defect occurring in a boundary area of the display panel can be prevented.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
   - a data driver comprising m source channels connected to m data lines and an additional source channel connected to an additional data line, wherein m is a natural number; and
   - a pixel unit comprising a plurality of sub-pixels disposed on n pixel rows and m pixel columns, wherein n is a natural number,
   - wherein each of the source channels provides a data signal of one color to the corresponding one of the m data lines,
   - wherein the additional source channel provides a data signal of one color to the additional data line,
   - wherein the additional data line is connected to a plurality of sub-pixels that are not connected to the m data lines among the plurality of sub-pixels, and
   - wherein a first data line of the m data lines is connected to a plurality of sub-pixels that are disposed on odd-numbered pixel rows of the n pixel rows and a first pixel column of the m pixel columns among the plurality of sub-pixels, and is connected to a plurality of sub-pixels that are disposed on even-numbered pixel rows of the n pixel rows and a third pixel column of the m pixel columns among the plurality of sub-pixels.

2. The display device of claim 1, wherein the plurality of sub-pixels that are not connected to the m data lines are disposed on the even-numbered pixel rows of the n pixel rows and the first pixel column of the m pixel columns.

3. The display device of claim 2, wherein the additional data line is disposed adjacent to the first data line of the m data lines.

4. The display device of claim 3, wherein
   - a second data line of the m data lines is connected to all of a plurality of sub-pixels that are disposed on a second pixel column of the m pixel columns among the plurality of sub-pixels,
   - a third data line of the m data lines is connected to a plurality of sub-pixels that are disposed on the odd-numbered pixel rows of the n pixel rows and the third pixel column of the m pixel columns among the plurality of sub-pixels, and is connected to a plurality of sub-pixels that are disposed on the even-numbered pixel rows of the n pixel rows and a fifth pixel column of the m pixel columns among the plurality of sub-pixels, and
   - a fourth data line of the m data lines is connected to all of a plurality of sub-pixels that are disposed on a fourth pixel column of the m pixel columns among the plurality of sub-pixels.

5. The display device of claim 4, wherein a first source channel of the m source channels connected to the first data line provides a data signal of a first color,
   - a second source channel of the m source channels connected to the second data line provides a data signal of a second color,
   - a third source channel of the m source channels connected to the third data line provides a data signal of a third color,
   - a fourth source channel of the m source channels connected to the fourth data line provides a data signal of the second color, and
   - the additional source channel connected to the additional data line provides a data signal of the third color.

6. The display device of claim 5, wherein the first color is red, the second color is green, and the third color is blue.

7. The display device of claim 5, wherein the first color is blue, the second color is green, and the third color is red.

8. A display device comprising:
   - a data driver comprising m source channels connected to m data lines and an additional source channel connected to an additional data line, wherein m is a natural number; and
   - a pixel unit comprising a plurality of sub-pixels disposed on n pixel rows and m pixel columns, wherein n is a natural number,
   - wherein each of the source channels provides a data signal of one color to the corresponding one of the m data lines,
   - wherein the additional source channel provides a data signal of one color to the additional data line,
   - wherein the additional data line is connected to a plurality of sub-pixels that are not connected to the m data lines among the plurality of sub-pixels, and
   - wherein
   - the plurality of sub-pixels that are not connected to the m data lines are disposed on even-numbered pixel rows of the n pixel rows and a (m−1)th pixel column of the m pixel columns, and
   - wherein a mth data line of the m data lines is connected to all of a plurality of sub-pixels that are disposed on a mth pixel column of the m pixel columns among the plurality of sub-pixels.

9. The display device of claim 8, wherein the additional data line is disposed adjacent to the mth data line of the m data lines.

10. The display device of claim 9, wherein
   - a (m−1)th data line of the m data lines is connected to a plurality of sub-pixels that are disposed on odd-numbered pixel rows of the n pixel rows and a (m−1)th pixel column among the plurality of sub-pixels, and is connected to a plurality of sub-pixels that are disposed on even-numbered pixel rows of the n pixel rows and a (m−3)th pixel column of the m pixel columns among the plurality of sub-pixels,
   - a (m−2)th data line of the m data lines is connected to all of a plurality of sub-pixels that are disposed on a (m−2)th pixel column of the m pixel columns among the plurality of sub-pixels, and
   - a (m−3)th data line of the m data lines is connected to a plurality of sub-pixels that are disposed on the odd-numbered pixel rows of the n pixel rows and the (m−3)th pixel column of the m pixel columns among the plurality of sub-pixels.

11. The display device of claim 10, wherein a (m−3)th channel of the m source channels connected to the (m−3)th data line provides a data signal of a first color,
   - a (m−2)th source channel of the m source channels connected to the (m−2)th data line provides a data signal of a second color, a (m−1)th source channel of the m source channels connected to the (m−1)th data line provides a data signal of a third color, a mth source channel of the m source channels connected to the mth data line provides a data signal of the second color, and the additional source channel connected to the additional data line provides a data signal of the first color.

12. The display device of claim 11, wherein the first color is red, the second color is green, and the third color is blue.

13. The display device of claim 11, wherein the first color is blue, the second color is green, and the third color is red.

14. A method of driving a display device, the method comprising:

supplying a data signal of a first color to a first data line of m data lines for every one horizontal period, wherein m is a natural number;

supplying a data signal of a second color to a second data line of the m data lines and a fourth data line of the m data lines for every one horizontal period;

supplying a data signal of a third color to a third data line of the m data lines for every one horizontal period; and supplying a data signal of the third color to an additional data line that is connected to a plurality of sub-pixels that are not connected to the m data lines among a plurality of sub-pixels for every one horizontal period, wherein the first data line of the m data lines is connected to a plurality of sub-pixels that are disposed on odd-numbered pixel rows of n pixel rows and a first pixel column of m pixel columns among the plurality of sub-pixels, and is connected to a plurality of sub-pixels that are disposed on even-numbered pixel rows of the n pixel rows and a third pixel column of the m pixel columns among the plurality of sub-pixels.

15. The method of claim 14, wherein the plurality of sub-pixels that are not connected to the m data lines are disposed on the even-numbered pixel rows of the n pixel rows and the first pixel column of the m pixel columns.

16. The method of claim 15, wherein the additional data line is disposed adjacent to the first data line of the m data lines.

17. The method of claim 16, wherein the second data line of the m data lines is connected to all of a plurality of sub-pixels that are disposed on a second pixel column of the m pixel columns among the plurality of sub-pixels, the third data line of the m data lines is connected to a plurality of sub-pixels that are disposed on the odd-numbered pixel rows of the n pixel rows and the third pixel column of the m pixel columns among the plurality of sub-pixels, and is connected to a plurality of sub-pixels that are disposed on the even-numbered pixel rows of the n pixel rows and a fifth pixel column of the m pixel columns among the plurality of sub-pixels, and a fourth data line of the m data lines is connected to all of a plurality of sub-pixels that are disposed on a fourth pixel column of the m pixel columns among the plurality of sub-pixels.

18. The method of claim 14, wherein the first color is red, the second color is green, and the third color is blue.

19. The method of claim 14, wherein the first color is blue, the second color is green, and the third color is red.

20. A method of driving a display device, the method comprising:

supplying a data signal of a first color to a first data line of m data lines for every one horizontal period, wherein m is a natural number;

supplying a data signal of a second color to a second data line of the m data lines and a fourth data line of the m data lines for every one horizontal period;

supplying a data signal of a third color to a third data line of the m data lines for every one horizontal period; and supplying a data signal of the third color to an additional data line that is connected to a plurality of sub-pixels that are not connected to the m data lines among a plurality of sub-pixels for every one horizontal period, wherein the plurality of sub-pixels that are not connected to the m data lines are disposed on even-numbered pixel rows of the n pixel rows and a (m−1)th pixel column of the m pixel columns, and wherein a mth data line of the m data lines is connected to all of a plurality of sub-pixels that are disposed on a mth pixel column of the m pixel columns among the plurality of sub-pixels.

21. The method of claim 20, wherein the additional data line is disposed adjacent to the mth data line of the m data lines.

22. The method of claim 21, wherein a (m−1)th data line of the m data lines is connected to a plurality of sub-pixels that are disposed on odd-numbered pixel rows of the n pixel rows and the (m−1)th pixel column among the plurality of sub-pixels, and is connected to a plurality of sub-pixels that are disposed on the even-numbered pixel rows of the n pixel rows and a (m−3)th pixel column of the m pixel columns among the plurality of sub-pixels, a (m−2)th data line of the m data lines is connected to all of a plurality of sub-pixels that are disposed on a (m−2)th pixel column of the m pixel columns among the plurality of sub-pixels, and a (m−3)th data line of the m data lines is connected to a plurality of sub-pixels that are disposed on the odd-numbered pixel rows of the n pixel rows and the (m−3)th pixel column of the m pixel columns among the plurality of sub-pixels.

* * * * *